United States Patent
Xu et al.

(10) Patent No.: US 11,122,602 B2
(45) Date of Patent: Sep. 14, 2021

(54) SHARED CHANNEL RATE MATCHING WITH WIDEBAND DEMODULATION REFERENCE SIGNAL FOR A CONTROL CHANNEL

(71) Applicant: QUALCOMM Incorporated, San Diego, CA (US)

(72) Inventors: Huilin Xu, San Diego, CA (US); Jing Sun, San Diego, CA (US); Heechoon Lee, San Diego, CA (US); Peter Pui Lok Ang, San Diego, CA (US)

(73) Assignee: QUALCMOM Incorporated, San Diego, CA (US)

( * ) Notice: Subject to any disclaimer, the term of this patent is extended or adjusted under 35 U.S.C. 154(b) by 0 days.

(21) Appl. No.: 16/506,743

(22) Filed: Jul. 9, 2019

(65) Prior Publication Data

US 2020/0022168 A1    Jan. 16, 2020

Related U.S. Application Data

(60) Provisional application No. 62/696,572, filed on Jul. 11, 2018.

(51) Int. Cl.
*H04W 72/12* (2009.01)
*H04W 16/14* (2009.01)

(52) U.S. Cl.
CPC ....... *H04W 72/1273* (2013.01); *H04W 16/14* (2013.01)

(58) Field of Classification Search
CPC ........... H04L 5/10; H04L 1/00; H04L 5/0053; H04W 72/1273; H04W 16/14
See application file for complete search history.

(56) References Cited

U.S. PATENT DOCUMENTS

2018/0302186 A1\* 10/2018 Reddy ................... H04L 5/0053
2019/0103941 A1\* 4/2019 Seo ........................... H04L 5/00
(Continued)

OTHER PUBLICATIONS

3GPP TSG RAN WG1 Meeting 93, "Remaining aspects for rate matching" Busan, Korea, May 21-25, 2018, agenda item 7.1.3.5, R-11806136 (Year: 2018).\*

(Continued)

*Primary Examiner* — Ayaz R Sheikh
*Assistant Examiner* — Louis Samara
(74) *Attorney, Agent, or Firm* — Holland & Hart LLP

(57) ABSTRACT

Methods, systems, and devices for wireless communications are described. A user equipment (UE) may receive downlink control information within a control resource set (CORESET) configured with a wideband demodulation reference signal (DMRS) and including disjoint segments of resource blocks (RBs). The downlink control information may be located at least partially within a first segment of the disjoint segments and a second segment of the disjoint segments may be exclusive of the downlink control information. The downlink control information may include a grant of a set of resources for a downlink shared channel that overlaps with the CORESET. The UE may determine a rate matching operation for the wideband DMRS for a downlink shared channel for portions of the set of resources that overlap with the second segment of the disjoint segments, and receive the downlink shared channel on the set of resources according to the determined rate matching operation.

16 Claims, 11 Drawing Sheets

(56) References Cited

U.S. PATENT DOCUMENTS

2019/0342062 A1* 11/2019 Ren .................... H04L 5/10
2020/0220703 A1* 7/2020 Kim .................... H04L 5/10
2020/0367242 A1* 11/2020 Moon .................. H04L 1/00

OTHER PUBLICATIONS

3GPP TSG RAN WG1 Meeting #92bis, Remaining Issues on PDSCH rate matching in CORESET, Sanya, China, Apr. 16-20, 2018, agenda item 7.3.1.5, R-1805250 (Year: 2018).*
Partial International Search Report—PCT/US2019/041226—ISA/EPO—dated Oct. 2, 2019 (183806WO).
Qualcomm Incorporated: "Remaining Issues on PDSCH Rate Matching in CORESET", 3GPP TSG RAN WG1 Meeting #92bis, 3GPP Draft; R1-1805250 Remaining Issues on PDSCH Rate Matching in CORESET, 3rd Generation Partnership Project (3GPP), Mobile Competence Centre, 650, Route Des Lucioles, F-06921 Sophia-Anti Polis Cedex, France, vol. RAN WG1, No. Sanya, China; Apr. 16, 2018-Apr. 20, 2018, Apr. 15, 2018 (Apr. 15, 2018), pp. 1-2, XP051427494, Retrieved from the Internet: URL: https://www.3gpp.org/ftp/Meetings_3GPP_SYNC/RAN1/Docs/ [retrieved on Apr. 15, 2018], Section 2.
ZTE: "Remaining Aspects for Rate Matching", 3GPP TSG RAN WG1 Meeting #93,3GPP Draft; R1-1806136 Remaining Aspects for Rate Matching, 3rd Generation Partnership Project (3GPP), Mobile Competence Centre; 650, Route Des Lucioles; F-06921 Sophia-Antipolis Cedex ; France, vol. RAN WG1, No. Busan. Korea; May 21, 2018-May 25, 2018 May 20, 2018, XP051441346, Retrieved from the Internet: URL: http://www.3gpp.org/ftp/Meetings_3GPP_SYNC/RAN1/Docs/ [retrieved on May 20, 2018], sections 2 and 4, 3 Pages.
International Search Report and Written Opinion—PCT/US2019/041226—ISA/EPO—dated Nov. 26, 2019 (183806WO).

* cited by examiner

SHARED CHANNEL RATE MATCHING WITH WIDEBAND DEMODULATION REFERENCE SIGNAL FOR A CONTROL CHANNEL

CROSS REFERENCE

The present application for patent claims the benefit of U.S. Provisional Patent Application No. 62/696,572 by XU, et al., entitled "SHARED CHANNEL RATE MATCHING WITH WIDEBAND DEMODULATION REFERENCE SIGNAL FOR A CONTROL CHANNEL," filed Jul. 11, 2018, assigned to the assignee hereof, and expressly incorporated herein.

BACKGROUND

The following relates generally to wireless communications, and more specifically to shared channel rate matching with wideband demodulation reference signal (DMRS) for a control channel.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support shared channel rate matching with wideband demodulation reference signal (DMRS) for a control channel. A base station in wireless communication with a user equipment (UE) may transmit downlink control information (DCI) within a control resource set (CORESET) configured with a wideband DMRS or narrowband DMRS. The DCI may include a grant for a set of time and frequency resources for a downlink shared channel that overlaps with the CORESET. The CORESET in which the DCI is transmitted may include a number of disjoint segments of resource blocks (RBs). The DCI may also be located at least partially within a first segment of a number of disjoint segments and a second segment of a number of disjoint segments may be exclusive of the DCI.

The UE may determine a rate matching operation for the wideband DMRS for the downlink shared channel for portions of the set of resources that overlap with the second segment of the disjoint segments. The UE may identify an aggregation level (AL) ambiguity at one AL because the DCI could be transmitted at a second AL. The first AL may correspond to a first set of control channel elements (CCEs) and the second AL may correspond to a second set of CCEs that at least partially overlap with the first set of CCEs. The UE may receive the downlink shared channel on the set of resources by rate matching the set of resources around portions of the second set of CCEs that are exclusive of the first set of CCEs.

A method of wireless communications is described. The method may include receiving DCI within a CORESET configured with a wideband demodulation reference signal (DMRS) and including a set of disjoint segments of resource blocks (RBs), where the DCI is located at least partially within a first segment of the set of disjoint segments and a second segment of the set of disjoint segments is exclusive of the DCI, and where the DCI includes a grant of a set of resources for a downlink shared channel that overlaps with the CORESET, determining a rate matching operation for the wideband DMRS for the downlink shared channel for portions of the set of resources that overlap with the second segment of the set of disjoint segments, and receiving the downlink shared channel on the set of resources according to the determined rate matching operation.

An apparatus for wireless communications is described. The apparatus may include a processor, memory in electronic communication with the processor, and instructions stored in the memory. The instructions may be executable by the processor to cause the apparatus to receive DCI within a CORESET configured with a wideband DMRS and including a set of disjoint segments of resource blocks (RBs), where the DCI is located at least partially within a first segment of the set of disjoint segments and a second segment of the set of disjoint segments is exclusive of the DCI, and where the DCI includes a grant of a set of resources for a downlink shared channel that overlaps with the CORESET, determine a rate matching operation for the wideband DMRS for the downlink shared channel for portions of the set of resources that overlap with the second segment of the set of disjoint segments, and receive the downlink shared channel on the set of resources according to the determined rate matching operation.

Another apparatus for wireless communications is described. The apparatus may include means for receiving DCI within a CORESET configured with a wideband DMRS and including a set of disjoint segments of RBs, where the DCI is located at least partially within a first segment of the set of disjoint segments and a second segment of the set of disjoint segments is exclusive of the DCI, and where the DCI includes a grant of a set of resources for a downlink shared channel that overlaps with the CORESET, determining a rate matching operation for the wideband DMRS for the downlink shared channel for portions of the set of resources that overlap with the second segment of the set of disjoint segments, and receiving the downlink shared channel on the set of resources according to the determined rate matching operation.

A non-transitory computer-readable medium storing code for wireless communications is described. The code may include instructions executable by a processor to receive DCI within a CORESET configured with a wideband DMRS and including a set of disjoint segments of RBs, where the DCI is located at least partially within a first segment of the set of disjoint segments and a second segment of the set of disjoint segments is exclusive of the DCI, and where the DCI includes a grant of a set of resources for a downlink shared channel that overlaps with the CORESET, determine a rate matching operation for the wideband DMRS for the downlink shared channel for portions of the set of resources that overlap with the second segment of the set of disjoint segments, and receive the downlink shared channel on the set of resources according to the determined rate matching operation.

In some examples of the method, apparatuses, and non-transitory computer-readable medium described herein, the rate matching operation includes rate matching around locations of the configured wideband DMRS in the portions of the set of resources of the downlink shared channel that overlap with the second segment of the set of disjoint segments.

In some examples of the method, apparatuses, and non-transitory computer-readable medium described herein, the rate matching operation includes processing locations of the configured wideband DMRS in the portions of the set of resources of the downlink shared channel that overlap with the second segment of the set of disjoint segments as data resources of the downlink shared channel.

Some examples of the method, apparatuses, and non-transitory computer-readable medium described herein may further include operations, features, means, or instructions for receiving, in the DCI, an indication to rate match the downlink shared channel around resources of the CORESET.

A method of wireless communications is described. The method may include receiving DCI at a first aggregation level (AL) within a CORESET configured with a wideband DMRS, where the DCI includes a grant of a set of resources for a downlink shared channel that overlaps with the CORESET, identifying an AL ambiguity between the DCI transmitted at the first AL and transmitted at a second AL, where the first AL corresponds to a first set of CCEs and the second AL corresponds to a second set of CCEs that at least partially overlap with the first set of CCEs, and receiving the downlink shared channel on the set of resources, where the receiving the downlink shared channel includes rate matching the set of resources around portions of the second set of CCEs that are exclusive of the first set of CCEs.

An apparatus for wireless communications is described. The apparatus may include a processor, memory in electronic communication with the processor, and instructions stored in the memory. The instructions may be executable by the processor to cause the apparatus to receive DCI at a first AL within a CORESET configured with a wideband DMRS, where the DCI includes a grant of a set of resources for a downlink shared channel that overlaps with the CORESET, identify an AL ambiguity between the DCI transmitted at the first AL and transmitted at a second AL, where the first AL corresponds to a first set of CCEs and the second AL corresponds to a second set of CCEs that at least partially overlap with the first set of CCEs, and receive the downlink shared channel on the set of resources, where the receiving the downlink shared channel includes rate matching the set of resources around portions of the second set of CCEs that are exclusive of the first set of CCEs.

Another apparatus for wireless communications is described. The apparatus may include means for receiving DCI at a first AL within a CORESET configured with a wideband DMRS, where the DCI includes a grant of a set of resources for a downlink shared channel that overlaps with the CORESET, identifying an AL ambiguity between the DCI transmitted at the first AL and transmitted at a second AL, where the first AL corresponds to a first set of CCEs and the second AL corresponds to a second set of CCEs that at least partially overlap with the first set of CCEs, and receiving the downlink shared channel on the set of resources, where the receiving the downlink shared channel includes rate matching the set of resources around portions of the second set of CCEs that are exclusive of the first set of CCEs.

A non-transitory computer-readable medium storing code for wireless communications is described. The code may include instructions executable by a processor to receive DCI at a first AL within a CORESET configured with a wideband DMRS, where the DCI includes a grant of a set of resources for a downlink shared channel that overlaps with the CORESET, identify an AL ambiguity between the DCI transmitted at the first AL and transmitted at a second AL, where the first AL corresponds to a first set of CCEs and the second AL corresponds to a second set of CCEs that at least partially overlap with the first set of CCEs, and receive the downlink shared channel on the set of resources, where the receiving the downlink shared channel includes rate matching the set of resources around portions of the second set of CCEs that are exclusive of the first set of CCEs.

In some examples of the method, apparatuses, and non-transitory computer-readable medium described herein, the CORESET includes a set of disjoint segments of RBs, and where the first set of CCEs may be located within a first subset of the set of disjoint segments and at least part of the portions of the second set of CCEs that may be exclusive of the first set of CCEs may be located within a second subset of the set of disjoint segments.

In some examples of the method, apparatuses, and non-transitory computer-readable medium described herein, the plurality of disjoint segments of RBs are contiguous.

In some examples of the method, apparatuses, and non-transitory computer-readable medium described herein, the receiving the downlink shared channel includes rate matching the set of resources around locations of the configured wideband DMRS in the second subset of the set of disjoint segments.

In some examples of the method, apparatuses, and non-transitory computer-readable medium described herein, at least one segment of the set of disjoint segments may be exclusive of the first set of CCEs and the second set of CCEs, and where the receiving the downlink shared channel includes processing locations of the configured wideband DMRS in the portions of the set of resources of the downlink shared channel that overlap with the at least one segment of the set of disjoint segments as data resources of the downlink shared channel.

In some examples of the method, apparatuses, and non-transitory computer-readable medium described herein, at least one segment of the set of disjoint segments may be exclusive of the first set of CCEs and the second set of CCEs, and where the receiving the downlink shared channel includes rate matching around locations of the configured wideband DMRS in the portions of the set of resources of the downlink shared channel that overlap with the at least one segment of the set of disjoint segments.

DETAILED DESCRIPTION

A user equipment (UE) may establish a connection with a base station, which may allocate time and frequency resources to the UE for downlink and uplink communication. The UE may be configured to monitor a control resource set (CORESET) where a downlink control information (DCI) is transmitted. A CORESET may include multiple resource blocks (RBs) in the frequency domain, and may include one or more modulation symbols in the time domain. The CORESET may include a total set of resources allocated for control information for the UE, and in some examples may include one or more control channel elements (CCEs) corresponding to a one or more physical downlink control channel (PDCCH) candidates.

The CORESET may, in some cases, be configured with a wideband demodulation reference signal (DMRS) or narrowband DMRS. In some cases, the CORESET in which the DCI is transmitted may include a number of disjoint segments of RBs. The DCI may also be located at least partially within a first segment of a number of disjoint segments and a second segment of a number of disjoint segments may be exclusive of the DCI. The UE may determine a rate matching operation for the wideband DMRS for a downlink shared channel for portions of the set of resources that overlap with the second segment of the disjoint segments. The UE may also identify an aggregation level (AL) ambiguity between the DCI when the DCI is transmitted at a first AL but could be transmitted at a second AL. The first AL may correspond to a first set of CCEs and the second AL may correspond to a second set of CCEs that at least partially overlap with the first set of CCEs. The UE may receive the downlink shared channel on the set of resources by rate matching the set of resources around portions of the second set of CCEs that are exclusive of the first set of CCEs. By configuring the UE with these schemes, the UE may enhance resource utilization, while also improving efficiency for the wireless communications between the base station and UE.

Aspects of the disclosure are initially described in the context of a wireless communications system. Aspects of the disclosure are then described with reference to configurations and process flows that relate shared channel rate matching with wideband DMRS for a control channel. Aspects of the disclosure are further illustrated by and described with reference to apparatus diagrams, system diagrams, and flowcharts that relate to shared channel rate matching with wideband DMRS for a control channel.

Figure 1:
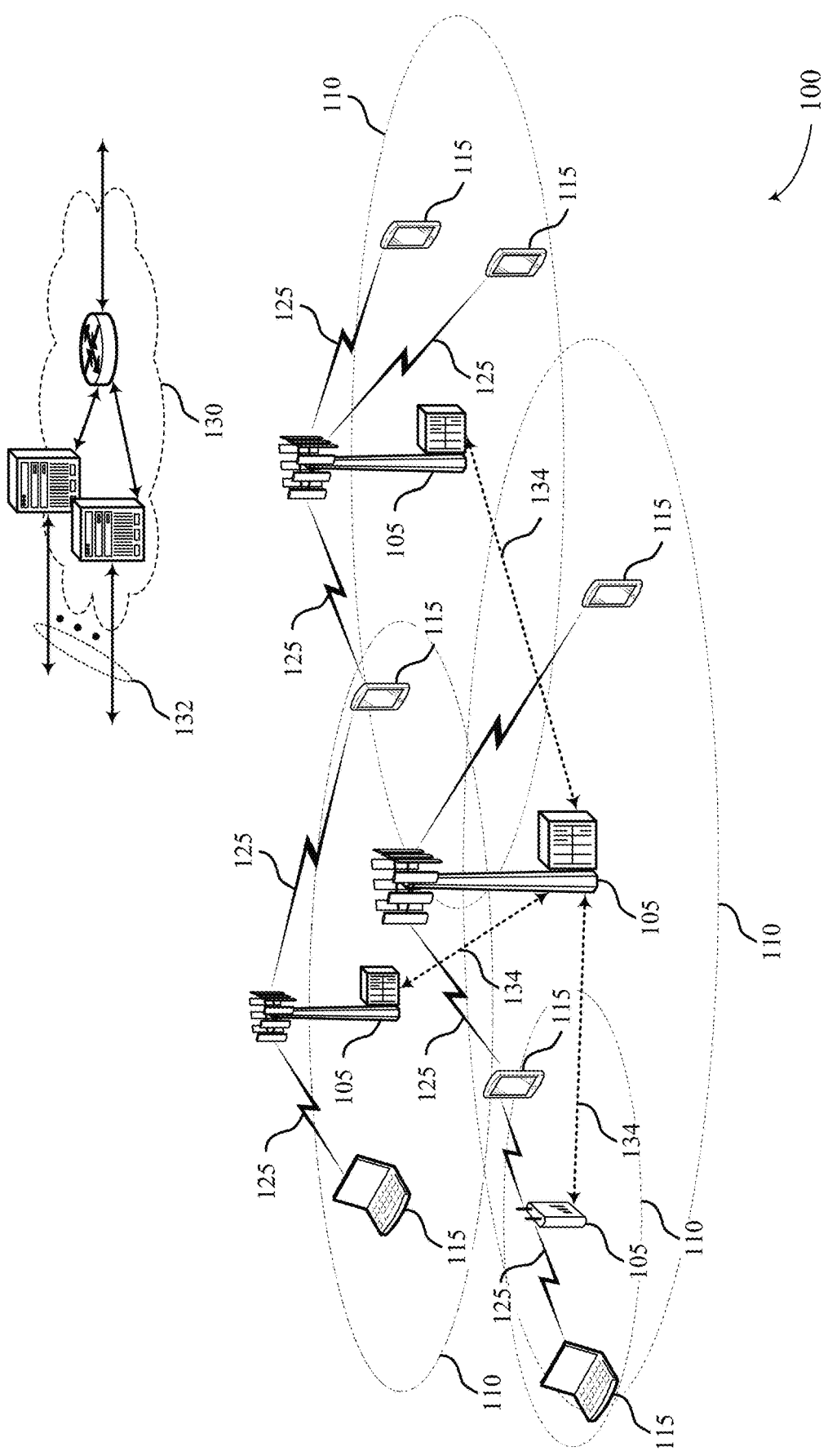
FIGS. 1 and 2 illustrate examples of a wireless communications system that supports shared channel rate matching with wideband demodulation reference signal (DMRS) for a control channel in accordance with aspects of the present disclosure.

FIG. 1 illustrates an example of a wireless communications system 100 that supports shared channel rate matching with wideband DMRS for a control channel in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Base station 105 may transmit, to UEs 115, a DCI within a CORESET configured with a wideband DMRS or a narrowband DMRS. UEs 115 may receive the DCI on a PDCCH. In some examples, the CORESET in which the DCI is transmitted may include a number of disjoint segments of RBs. The DCI may be located at least partially within a first segment of the number of disjoint segments and a second segment of the number of disjoint segments may be exclusive of the DCI. UEs 115 may determine a rate matching operation for the wideband DMRS for the downlink shared channel for portions of the set of resources that overlap with the second segment of the disjoint segments. In some cases, UEs 115 may identify an AL ambiguity between the DCI transmitted at a first AL and transmitted at a second AL. The first AL may correspond to a first set of CCEs and the second AL may correspond to a second set of CCEs that at least partially overlap with the first set of CCEs. UEs 115 may receive the downlink shared channel on the set of resources by rate matching the set of resources around portions of the second set of CCEs that are exclusive of the first set of CCEs.

Figure 2:
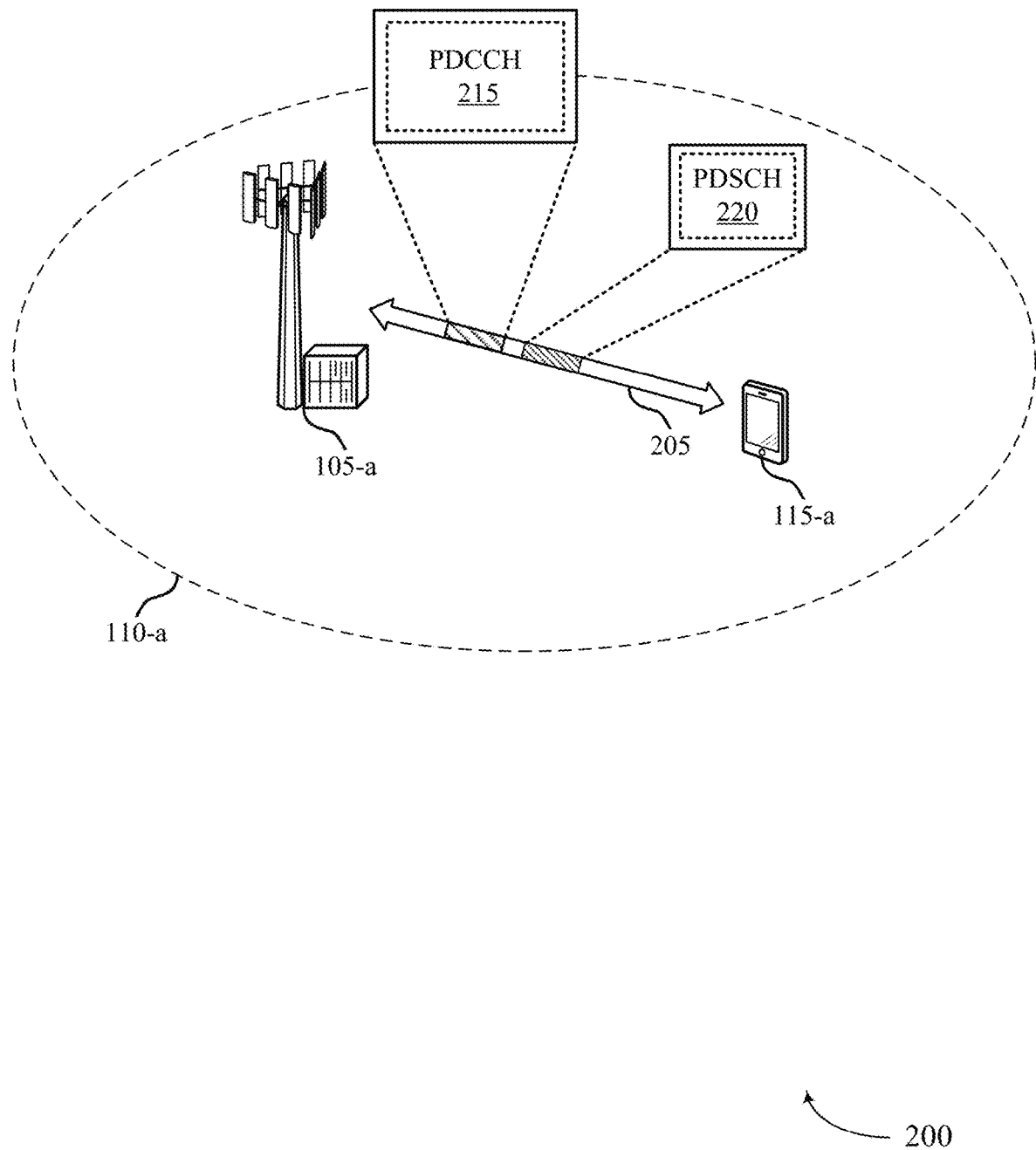

FIG. 2 illustrates an example of a wireless communications system 200 that supports shared channel rate matching with wideband DMRS for a control channel in accordance with aspects of the present disclosure. In some examples, the wireless communications system 200 may implement aspects of the wireless communication system 100. The wireless communications system 200 may include a base station 105-*a* and a UE 115-*a*, which may be examples of the corresponding devices described with reference to FIG. 1.

The base station 105-*a* may perform a communication procedure (e.g., an RRC procedure, such as a cell acquisition procedure, random access procedure, RRC connection procedure, RRC configuration or reconfiguration procedure, etc.) with the UE 115-*a*. The base station 105-*a* and UE 115-*a* may be configured with multiple antennas, which may be used for directional or beamformed transmissions. The base station 105-*a* may, as part of the communication procedure, establish a bi-directional communication link 205 for communication with the UE 115-*a* within a geographic area 110-*a*.

As part of the communication procedure, the base station 105-*a* may configure the UE 115-*a* with time and frequency resources to use for downlink and uplink communication in the wireless communications system 200. The time and frequency resources may be defined by a resource element (RE), a resource block (RB), or a resource element group (REG), etc. An RE may span one modulation symbol by one sub-carrier. Each RE may also carry two, four, six, or eight physical channel bits, depending on whether a modulation scheme is QPSK, 16-QAM, 64-QAM, or 256-QAM. In some cases, two or more REs may be grouped into RBs, each of which may span a number of sub-carriers (e.g., twelve sub-carriers) and a number of symbol periods (e.g., two, four, seven, etc.).

Following the communication procedure, the base station 105-*a* may transmit a scheduling command to the UE 115-*a* using bi-directional communication link 205. For example, the base station 105-*a* may transmit the scheduling command in a DCI on a PDCCH 215 via bi-directional communication link 205. The scheduling command may inform the UE 115-*a* of forthcoming data transmission(s) via physical data shared channel (PDSCH) 220, as well as other information such as RB allocation and a modulation scheme (e.g., QPSK, 16-QAM, 64-QAM, or 256-QAM).

In an example, a resource downlink and uplink transmission structure may include a control region and a data region, for examples, as depicted in FIGS. 3 through 5. The control region and data region may span a number of modulation symbols in the time domain and a number of subcarriers in the frequency domain. The control region may contain a PDCCH 215, while the data region may contain PDSCH 220. In some examples, the control region and the data region may overlap in the time domain. In this example, the UE 115-*a* may reuse resources of a CORESET associated with the PDCCH 215 as part of the PDSCH 220, as described herein. For example, the PDSCH 220 may overlap with a CORESET of the PDCCH 215, and may use resources that overlap with the CORESET that do not carry DCI. As such, in some cases, the UE 115-*a* may receive a DCI on PDCCH 215 within a segment of a CORESET and related data on PDSCH 220 within a second segment of the CORESET (as well as other PDSCH resources).

Prior to the transmission of PDCCH 215, the base station 105-*a* may process the PDCCH 215 by manipulating the DCI by attachment of a cyclic redundancy check (CRC) and error correction coding, in a manner that may depend on a radio network temporary identifier (RNTI) of the UE 115-*a*. The base station 105-*a* may map the PDCCH 215 onto REs using a modulation scheme, such as a single antenna transmission or open-loop transmit diversity depending on a number of antenna ports. The RE mapping for the PDCCH 215 may be organized using CCEs, each of which may include a number of REGs.

In an example in which the wireless communications system 200 may implement aspects of a NR wireless communications system, the PDCCH 215 may be mapped to one or more CORESETs containing a set of CCEs. A CORESET may correspond to a control region in legacy wireless communications systems. In NR wireless communications systems, a CORESET may have both a frequency domain region and time domain region defined by the base station 105-*a* (e.g., via RRC signaling).

Within the CORESET, the CCEs may be organized into search space sets by the base station 105-*a*. A search space set may include one or more search spaces, where each search space may be associated with different ALs. The search space sets may include one or more common search space sets available to all or a group of UEs in communication with the base station 105-*a* including UE 115-*a*. The common search space sets may be located at fixed positions within a control region (e.g., downlink control region). The search space sets may also include UE-specific search space sets that are configured for particular UEs. These search space sets may have positions within a control region that depend on the UE's RNTI. Each search space set (e.g., a common search space set or UE-specific search space set) may contain several positions where the base station 105-*a* may transmit control information (e.g., DCI).

A search space set may also include a set of ALs for one or more DCI formats, where a combination of DCI format and AL may be referred to as a PDCCH candidate or a "decoding candidate." The AL may be an indication of a number of CCEs used by the base station 105-*a* to transmit control information to the UE 115-*a*. For example, a search space set may include decoding candidates at ALs of 1, 2, 4, 8, or 16 (AL1, AL2, AL4, AL8, and AL16). Each AL may include a number of PDCCH candidates associated with different DCI formats. Each AL may correspond to a number of CCEs allocated for PDCCH candidate. For example, AL4 may indicate that control information for that AL is transmitted in four CCEs of a CORESET. The base station 105-*a* may transmit DCI within a search space set in search space candidates (e.g., PDCCH candidates) for different ALs.

In some scenarios, a CORESET may have one or more disjoint segments of RBs across a control region. In an example, a first RB segment and a second RB segment corresponding to a CORESET may have a same frequency resource (e.g., same sub-carrier allocation) but different time resource (e.g., different modulation symbol allocation). Alternatively, the first RB segment and the second RB segment may correspond to different frequency resources (e.g., different sub-carrier allocations) but within the same time resource (e.g., same modulation symbol allocation). RBs within a segment may be contiguous. In some cases, an RB allocated for the CORESET of the PDCCH 215 may overlap with an RB allocated for the PDSCH 220 scheduled by the PDCCH 215. In cases of RB overlapping within the wireless communications system 200, there may be resources (e.g., time and frequency resources) that are wasted or unused by the UE 115-*a*. To decrease instances of unexploited resources and maximize resource utilization by the UE 115-*a* (e.g., PDSCH related transmissions), the base station 105-*a* may configure the UE 115-*a* with a rate matching scheme. Additionally, there may be an AL ambiguity as to what AL to use for decoding PDCCH candidates. The AL ambiguity may be a result of encoding DCI at a longer AL that also produces a passing decode when only a subset corresponding to a lower AL is decoded. For example, when an AL16 PDCCH is transmitted, the UE 115-*a* may successfully decode a DCI with a CRC pass from 8 CCEs of the AL16 PDCCH that overlap with CCEs of an AL8 PDCCH candidate. In this case, the UE 115-*a* may not be able (e.g., without resolving the ambiguity by additional decoding) to determine whether the DCI was encoded at AL8 or AL16. In some cases, the AL ambiguity may extend across different segments (e.g., the AL8 candidate in a first segment and the AL16 candidate in the first segment and a second segment).

To efficiently and effectively decode segments of a control region when RB overlapping occurs, the base station 105-*a* may dynamically configure the UE 115-*a* (e.g., via DCI) to rate match PDSCH 220 around PDCCH 215, which schedules the PDSCH 220. The UE 115-*a* may receive the PDCCH 215, which may carry an indication that resources allocated to the PDSCH 220 partially overlap with RBs of the CORESET in which the PDCCH 215 is configured. PDSCH 220 rate matching around the PDCCH 215, when the UE 115-*a* is configured with this rate matching scheme, may maximize usable resources (e.g., time and frequency resources) for PDSCH 220. If the UE 115-*a* is not configured with the rate matching scheme, the UE 115-*a* may perform PDSCH 220 rate matching around the entire CORESET where the scheduling PDCCH 215 is transmitted.

In some cases, a narrowband DMRS or wideband DMRS may be configured in a CORESET by the base station 105-*a* for demodulation of PDCCH 215. When a narrowband DMRS is configured in a CORESET, the DMRS may be transmitted within RBs of CCEs carrying the PDCCH 215 payload. Alternatively, when a wideband DMRS is configured in a CORESET, the DMRS may be transmitted within RBs of CCEs carrying the PDCCH 215 payload and RBs that do not carry the PDCCH 215 payload.

In an example, if a CORESET contains multiple segments (e.g., sets of CCEs) and a wideband DMRS is configured by the base station 105-a, the UE 115-a may perform PDSCH rate matching following the PDCCH 215 detection. In some cases, the UE 115-a may rate match around CCEs of the scheduling PDCCH 215, and around locations of the configured wideband DMRS REs in all segments. Alternatively, the UE 115-a may rate match around CCEs of the scheduling PDCCH 215, and around locations of wideband DMRS only in the segments that contain CCEs of the PDCCH 215. This may result in more usable resources for PDSCH 220 in segments that contain no CCEs of the scheduling PDCCH 215. As such, the UE 115-a rate matching behavior may be independent to the base station 105-a behavior (i.e., the UE 115-a may perform PDSCH rate matching around locations of wideband DMRS REs in segments that do not contain DCI, regardless of whether the wideband DMRS is transmitted or not, as long as the base station 105-a and the UE 115-a have consistent information regarding whether the base station 105-a is transmitting the PDSCH 220 over the wideband DMRS RE locations).

In some cases there may be a level of AL uncertainty, also referred to herein as "AL ambiguity," for decoding PDCCH candidates within a control region. For example, when an AL16 PDCCH is transmitted by the base station 105-a, the UE 115-a may successfully decode DCI with a CRC pass from 8 CCEs of the AL16 PDCCH that overlap with CCEs of an AL8 PDCCH candidate. This AL ambiguity between AL8 PDCCH and AL16 PDCCH may occur, for example, when a non-interleaved CORESET is one symbol (e.g., OFDM symbol) in length and AL8 and AL16 PDCCH candidates have a same starting CCE. To handle AL ambiguity for decoding PDCCH candidates in case CCEs of PDCCH candidates extend across different RB segments, the UE 115-a may rate match for PDSCH around CCEs using a highest AL. For example, when both narrowband DMRS and PDSCH rate matching scheme around the scheduling PDCCH are configured, if AL ambiguity condition between AL8 and AL16 exists, the UE 115-a may successfully decode a PDCCH with AL8 or AL16, and rate match for PDSCH around CCEs of the AL16 PDCCH candidate(s) and the narrowband DMRS embedded in the RBs that carry CCEs of the AL16 PDCCH candidate. Alternatively, when both wideband DMRS and PDSCH rate matching scheme around the scheduling PDCCH are configured, the PDSCH rate matching may depend on one or more factors. An example factor may be whether an AL8 or an AL16 PDCCH candidate is detected. Another example factor may be whether the PDSCH rate matching around locations of the wideband DMRS is performed in all segments or only in segments that contain CCEs of the PDCCH candidate.

Figure 3A:
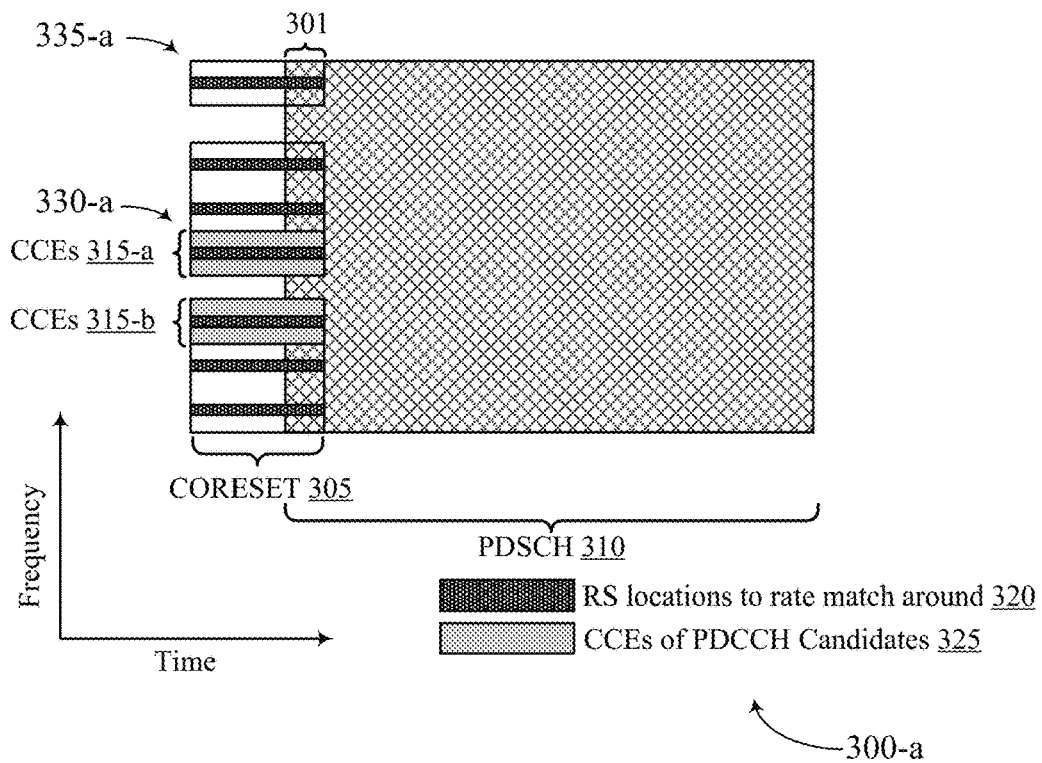
FIGS. 3A and 3B illustrate examples of a configuration that supports shared channel rate matching with wideband DMRS for a control channel in accordance with aspects of the present disclosure.
Figure 3B:
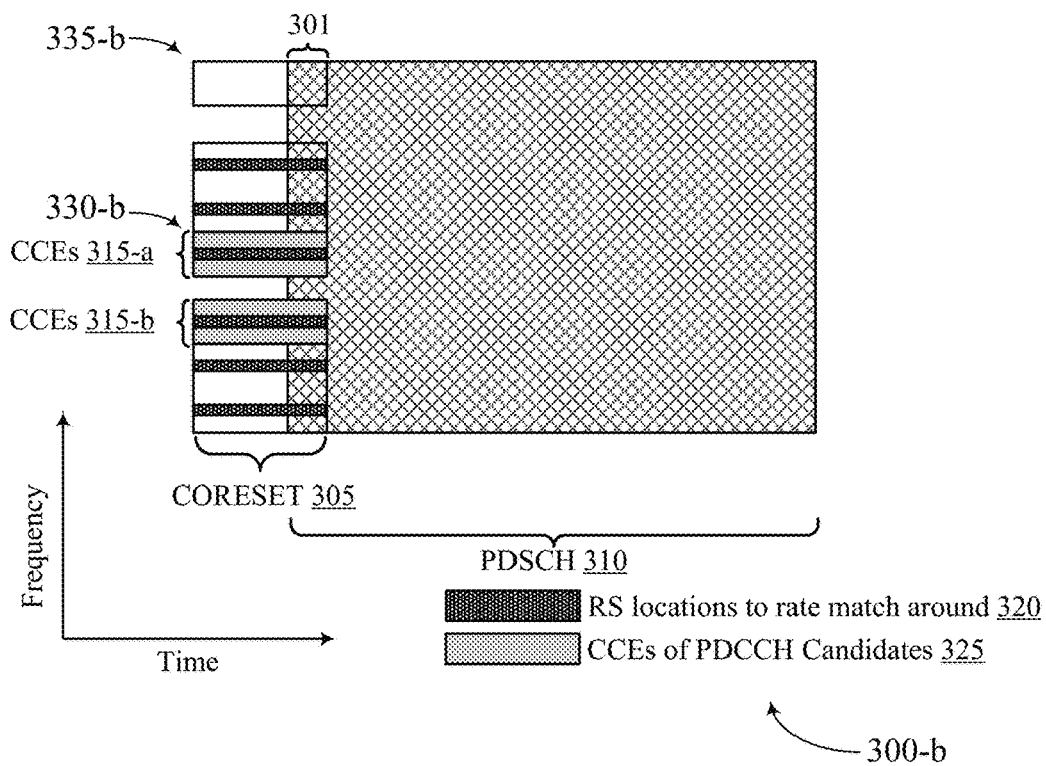

FIGS. 3A and 3B illustrate examples of configurations 300 that support shared channel rate matching with wideband DMRS for a control channel in accordance with aspects of the present disclosure. With reference to FIGS. 3A and 3B, configurations 300-a and 300-b may be implemented by aspects of wireless communications system 100 and 200. For example, the configurations 300-a and 300-b may depict a control region and a data region. The control region may include a CORESET 305. Within the CORESET 305 there may be reference signals embedded within RBs of CCEs, which may be wideband DMRS or a narrowband DMRS. For example, locations 320 of configured reference signals may correspond to DMRS REs that the PDSCH 310 may be rate matched around by the UE 115-a. The data region may include PDSCH 310. In some examples, a grant of the PDSCH 310 may include resources (e.g., time and frequency resources) that may at least partially overlap with CORESET 305 in the time domain and/or frequency domain. In FIGS. 3A and 3B, CORESET 305 is illustrated as overlapping in frequency with PDSCH 310 during time period 301. However, in some cases only portions (e.g., one or more segments or portions of segments) of CORESET 305 may overlap with PDSCH 310 during time period 301.

With reference to FIGS. 2 and 3A, the UE 115-a may, within each search space set associated with the CORESET 305, identify possible PDCCH candidates from CCEs 315 (e.g., CCEs where a base station may have transmitted a PDCCH). The UE 115-a may monitor the search space sets for the PDCCH candidates over CCEs, and may perform blind decoding for the PDCCH candidates 325, during which multiple decode attempts are carried out in the search spaces of the search space sets until the DCI is detected. If certain PDCCH candidates are detected (e.g., an AL16 PDCCH candidate or other PDCCH candidate for which no AL ambiguity is identified) when monitoring the search space sets, the UE 115-a may not need to handle an AL ambiguity condition between PDCCH candidates at different ALs. In this case, the UE 115-a may perform rate matching around CCEs of the PDCCH candidate and wideband DMRS within RBs carrying these CCEs. For example, the UE 115-a may detect AL16 PDCCH candidate spanning CCEs 315-a and CCEs 315-b. The UE 115-a may rate match around the CCEs 315-a and the CCEs 315-b including locations 320 of the configured reference signal (e.g., locations of configured wideband DMRS).

In some cases, the UE 115-a may be configured (e.g., statically or via RRC signaling) to rate match the PDSCH 310 around locations of the configured wideband reference signal (e.g., DMRS) throughout the CORESET 305. In some cases, the UE 115-a may be preconfigured to rate match the PDSCH 310 around locations of the configured wideband DMRS throughout the CORESET 305, for example, if the UE 115-a rate matches the PDSCH 310 around the scheduling PDCCH. As shown in FIG. 3A for example, the UE 115-a may rate match the PDSCH 310 around locations of configured wideband DMRS REs outside RBs carrying CCEs of the PDCCH candidates 325. For example, the UE 115-a may rate match the PDSCH 310 around locations of configured wideband DMRS REs in all segments including segments 330-a that contain CCEs of PDCCH candidate 325 that schedules that PDSCH 310 and segments 335-a that do not contain CCEs of the PDCCH candidate.

Alternatively, the UE 115-a may be configured (e.g., statically or via RRC signaling) to rate match the PDSCH 310 around locations of configured wideband DMRS only in segments that contain CCEs of the PDCCH candidate that schedules the PDSCH 310. In some cases, the UE 115-a may be preconfigured to rate match the PDSCH 310 around locations of configured wideband DMRS only in segments that contain CCEs of the PDCCH candidate that schedules the PDSCH 310, for example, if the UE 115-a rate matches the PDSCH 310 around the scheduling PDCCH. With reference to FIG. 3B for example, the UE 115-a may rate match only in segments 330-b that contain CCEs of the PDCCH candidate. For example, the rate matching may only be performed on segments 330-b that include CCEs 315-a or CCEs 315-b. Thus, UE 115-a may consider resources within segment 335-b corresponding to locations of the configured wideband DMRS to be used for the PDSCH 310. In these cases, the base station 105-*a* may not transmit wideband reference signal within segments 335-*b* that do not overlap with CCEs of the transmitted PDCCH candidate.

Figure 4A:
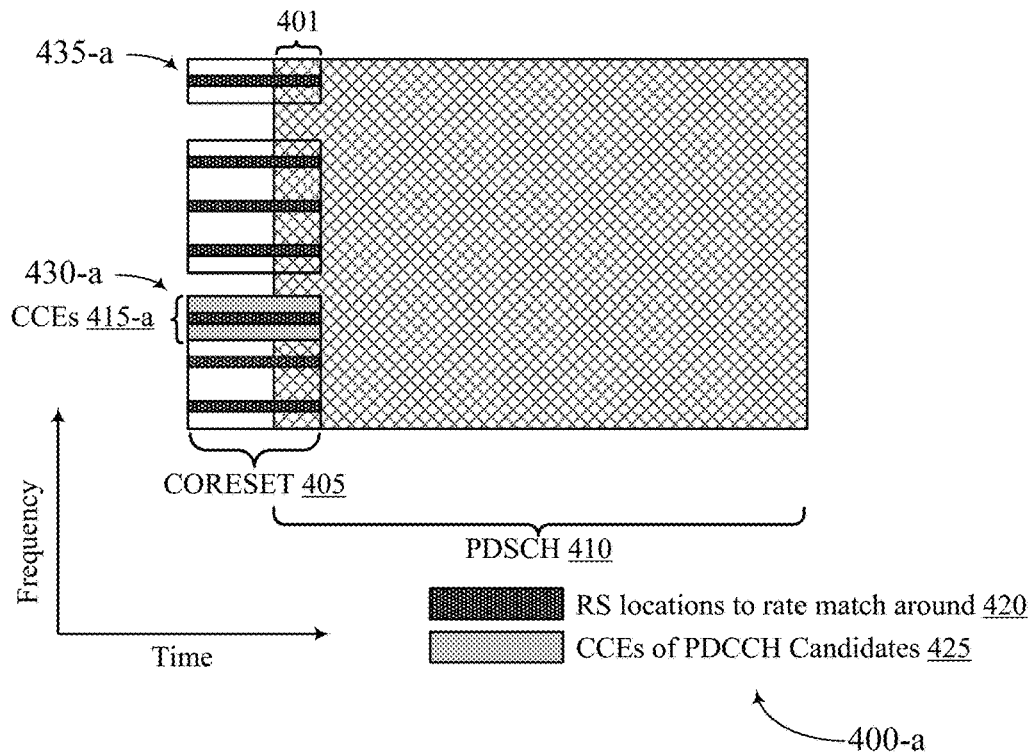
FIGS. 4A and 4B illustrate examples of a configuration that supports shared channel rate matching with wideband DMRS for a control channel in accordance with aspects of the present disclosure.
Figure 4B:
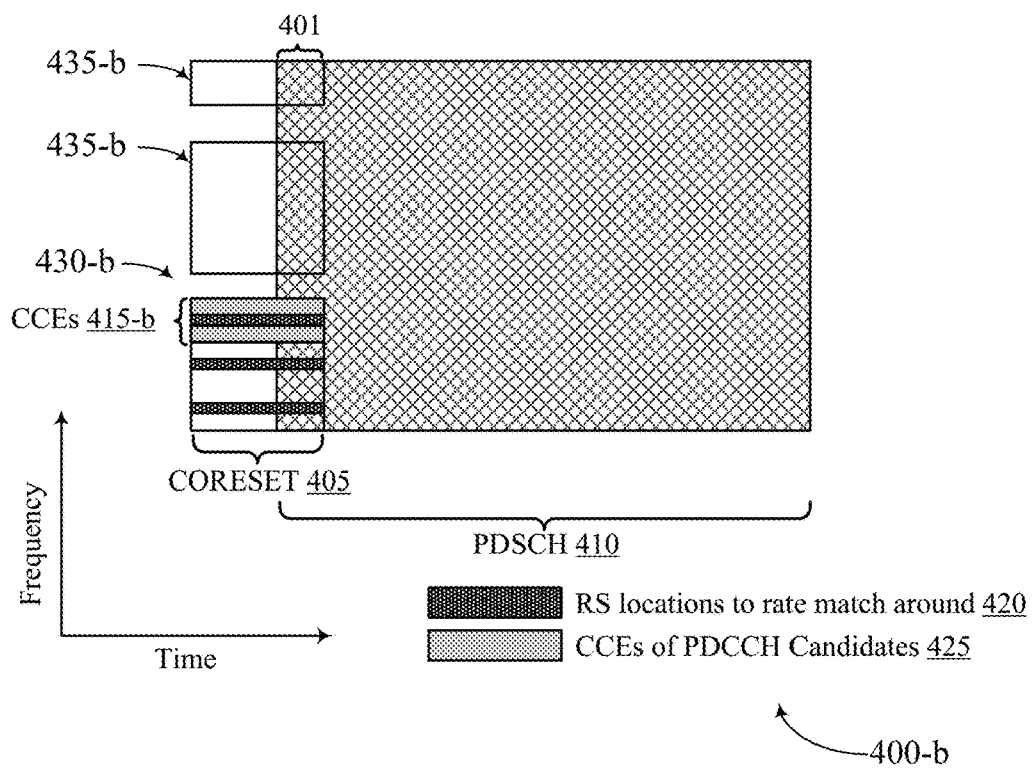

FIGS. 4A and 4B illustrate examples of configurations 400 that support shared channel rate matching with wideband DMRS for a control channel in accordance with aspects of the present disclosure. With reference to FIGS. 4A and 4B, configurations 400-*a* and 400-*b* may be implemented by aspects of wireless communications system 100 and 200. For example, the configurations 400-*a* and 400-*b* may depict a control region and a data region. The control region may include a CORESET 405. The CORESET 405 may be configured with a reference signal, which may be a wideband DMRS or a narrowband DMRS. The data region may include PDSCH 410. In some examples, the PDSCH 410 may at least partially overlap resources of CORESET 405 in the time domain and/or frequency domain. In FIGS. 4A and 4B, CORESET 405 is illustrated as overlapping in frequency with PDSCH 410 during time period 401. However, in some cases only portions (e.g., one or more segments or portions of segments) of CORESET 405 may overlap with PDSCH 410 during time period 401.

With reference to FIGS. 2 and 4A, the UE 115-*a* may, within each search space sets associated with the CORESET 405, identify possible PDCCH candidates from CCEs (e.g., CCEs 415-*a* where the base station 105-*a* may have transmitted a PDCCH). The UE 115-*a* may monitor the search space sets for the PDCCH candidates, and may perform blind decoding for the PDCCH candidates over CCEs 425.

In some cases, UE 115-*a* may be configured (e.g., statically, semi-statically via RRC signaling, or dynamically via DCI) to rate match the PDSCH 410 around locations 420 of the configured wideband reference signal (e.g., DMRS) across all segments. In some cases, the UE 115-*a* may be preconfigured to rate match the PDSCH 410 around locations 420 of the configured wideband reference signal (e.g., DMRS) across all segments. With reference to FIG. 4A, the AL8 PDDCH may be detected in the CCEs 415-*a* and the UE 115-*a* may identify no AL ambiguity. In this case, the UE 115-*a* may rate match the scheduled PDSCH 410 in all segments including segment 430-*a* that contain CCEs of the PDCCH candidate (e.g., AL8 PDCCH candidate of the CCEs 415-*a*) and segments 435-*a* that do not contain CCEs of the PDCCH candidate.

Alternatively, the base station 105-*a* may configure (e.g., statically, semi-statically via RRC signaling, or dynamically via DCI) the UE 115-*a* to not rate match the PDSCH 410 around locations 420 of the configured reference signals of segments that do not overlap with CCEs carrying the detected PDCCH candidate. In some cases, the UE 115-*a* may be preconfigured to refrain from rate matching the PDSCH 410 around locations 420 of the configured reference signals of segments that are non-overlapping with CCEs carrying the detected PDCCH candidate. With reference to FIG. 4B, AL8 PDDCH candidate may be detected in CCEs 415-*a* and the UE 115-*a* may identify no AL ambiguity condition. In this case, the UE 115-*a* may rate match only in segments (e.g. segment 430-*b*) that contain CCEs 415-*a* of the AL8 PDCCH candidate. Thus, UE 115-*a* may consider resources within segments 435-*b* corresponding to locations of the configured wideband DMRS to be used for the scheduled PDSCH. In these cases, the base station 105-*a* may not transmit wideband reference signal within segments 435-*b* that do not overlap with CCEs of the scheduling PDCCH.

Figure 5A:
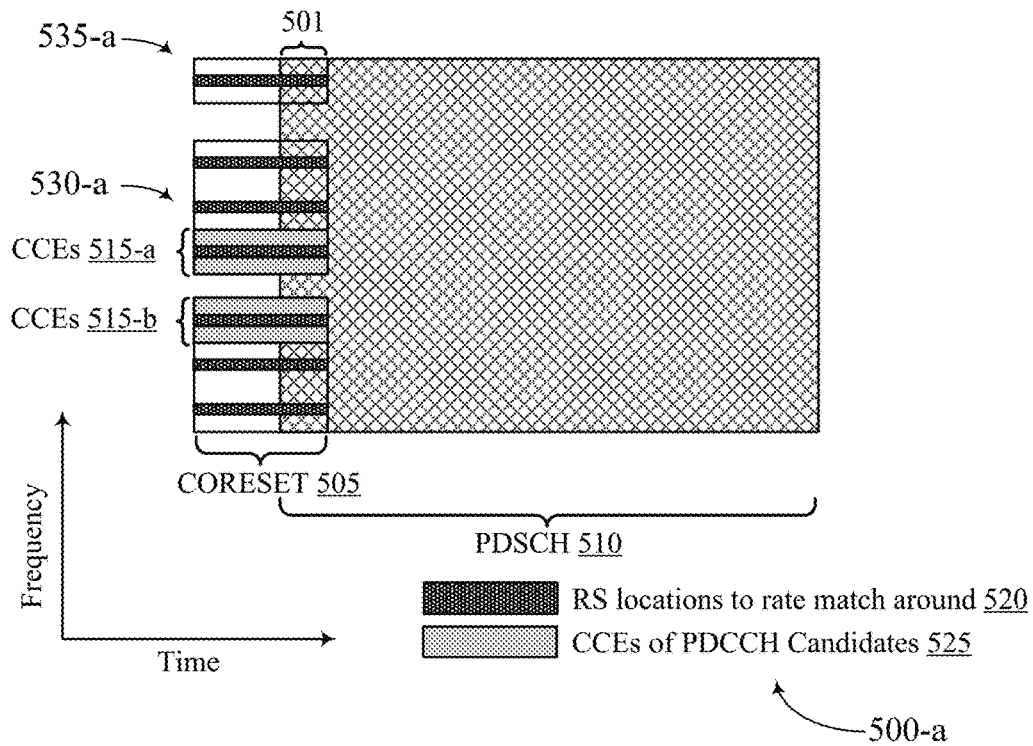
FIGS. 5A and 5B illustrate examples of a configuration that supports shared channel rate matching with wideband DMRS for a control channel in accordance with aspects of the present disclosure.
Figure 5B:
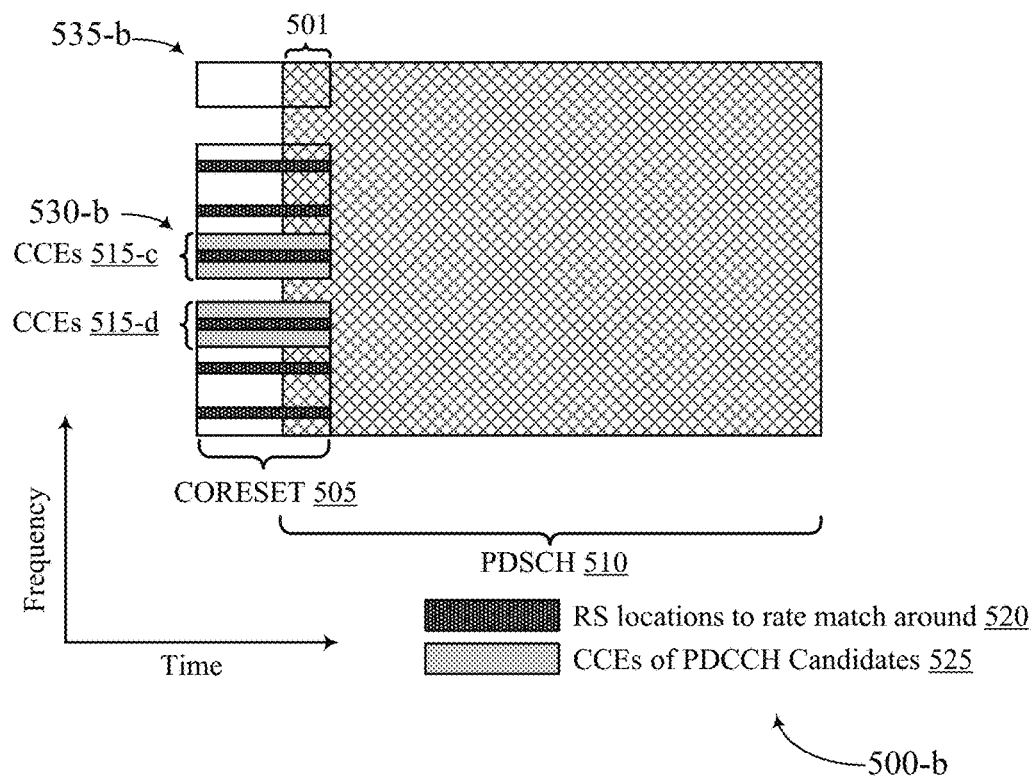

FIGS. 5A and 5B illustrate examples of configurations 500 that support shared channel rate matching with wideband DMRS for a control channel in accordance with aspects of the present disclosure. With reference to FIGS. 5A and 5B, configurations 500-*a* and 500-*b* may be implemented by aspects of wireless communications system 100 and 200. For example, the configurations 500 may depict a control region and a data region. The control region may include a CORESET 505 that may be configured with a reference signal, which may be a wideband DMRS or a narrowband DMRS. The data region may include PDSCH 510. In some examples, a grant of the PDSCH 510 may include resources (e.g., time and frequency resources) that may at least partially overlap with CORESET 505 in the time domain and/or frequency domain. In FIGS. 5A and 5B, CORESET 505 is illustrated as overlapping in frequency with PDSCH 510 during time period 501. However, in some cases only portions (e.g., one or more segments or portions of segments) of CORESET 505 may overlap with PDSCH 510 during time period 501.

With reference to FIGS. 2 and 5A, the UE 115-*a* may, within each search space sets associated with the CORESET 505, identify possible PDCCH candidates (e.g., CCEs 515-*a* and CCEs 515-*b* where base station 105-*a* may have transmitted a PDCCH). The UE 115-*a* may monitor the search space sets for the PDCCH candidates, and may perform blind decoding for the PDCCH candidates over CCEs 515-*a* and/or CCEs 515-*b*.

With reference to FIG. 5A, if a first PDCCH candidate is detected and the UE 115-*a* identifies an AL ambiguity condition between the first PDCCH and a second PDCCH candidate, the UE 115-*a* may perform rate matching for PDSCH 510 around CCEs 515-*a* of the first PDCCH candidate. The rate matching may also be performed around positions of the wideband DMRS REs outside RBs carrying these CCEs, according to a rate matching configuration.

With reference to FIG. 5A, a first PDDCH candidate may be detected in CCEs 515-*a* and the UE 115-*a* may identify an AL ambiguity condition (e.g., an AL ambiguity between the first PDCCH candidate and a second PDCCH candidate at a higher AL). For example, the AL ambiguity condition may be between the detected PDCCH candidate in CCEs 515-*a* and a PDCCH candidate that spans CCEs 515-*a* and CCEs 515-*b*. In this case, the UE 115-*a* may rate match the PDSCH around CCEs 515-*a* and CCEs 515-*b*. In some examples, the UE 115-*a* may, according to the rate matching configuration, rate match around locations 520 of the configured wideband reference signal in all segments (e.g., including segments 530-*a* that contain CCEs of the second, larger PDCCH candidate and segments 535-*a* that do not contain CCEs of the PDCCH candidates).

Alternatively, the UE 115-*a* may be configured (e.g., via the rate matching configuration) to rate match around locations 520 of the configured wideband reference signal in segments that contain CCEs associated with a detected PDCCH candidate, or any PDCCH candidates that have an AL ambiguity with the detected PDCCH candidate. That is, the UE 115-*a* may be configured to not rate match around locations of the configured wideband reference signal that would be present in a segment (e.g., segment 535-*b*) if the segment contained CCES associated with a detected PDCCH candidate or a candidate that has an AL ambiguity with the detected PDCCH candidate. The rate matching configuration may be statically configured for the UE 115-*a*, or may be semi-statically configured (e.g., via RRC signaling) for the UE 115-*a*. In some cases, the UE 115-*a* may refrain from rate matching around locations 520 of the configured wideband reference signal in segments that do not contain any CCEs associated with a detected PDCCH candidate, or any PDCCH candidates that have an AL ambiguity condition with the detected PDCCH candidate. With reference to FIG. 5B, the UE 115-a may rate match around locations 520 of the configured wideband reference signal in segments 530-b that contain CCEs (e.g., CCEs 515-a and/or CCEs 515-b) of the second, larger PDCCH candidate and not in segments 535-b that do not contain CCEs of the AL16 PDCCH candidate. Thus, UE 115-a may consider resources within segments 535-b corresponding to the wideband reference signal to be used for PDSCH. In these cases, the base station may not transmit wideband reference signal within segments 535-b that do not overlap with CCEs of the transmitted PDCCH candidate or other candidates having an AL ambiguity with the transmitted PDCCH candidate.

With reference to FIG. 2, the UE 115-a may receive the PDCCH 215 by reading higher layer PDCCH configuration (e.g., a higher-layer parameter, such as a precoder granularity parameter) and identifying a size of a control region and locations of the common and UE-specific search space sets. For example, the UE 115-a may use a same precoding across all resource element groups within a set of contiguous RBs in a CORESET if the higher layer PDCCH configuration provides an indication of the set of contiguous RBs. Within each search space sets, the UE 115-a may identify possible PDCCH candidates, which are CCEs where the base station 105-a may have transmitted the PDCCH 215. The UE 115-a may monitor the search space sets for the PDCCH decoding candidates, and may perform blind decoding for the PDCCH candidates, during which multiple decode attempts are carried out in the search spaces until the DCI is detected. The UE 115-a may then read the DCI and function accordingly, for example, perform rate matching and receive PDSCH 220 in a following DL transmission from the base station 105-a.

By configuring the UE 115-a with the above scheme, the UE 115-a may increase realization of its resources and decrease instances of unused resources. Additionally, by configuring the UE 115-a with the above scheme (e.g., handling AL ambiguity) may result in improved efficiency for the wireless communications system 200.

Figure 6:
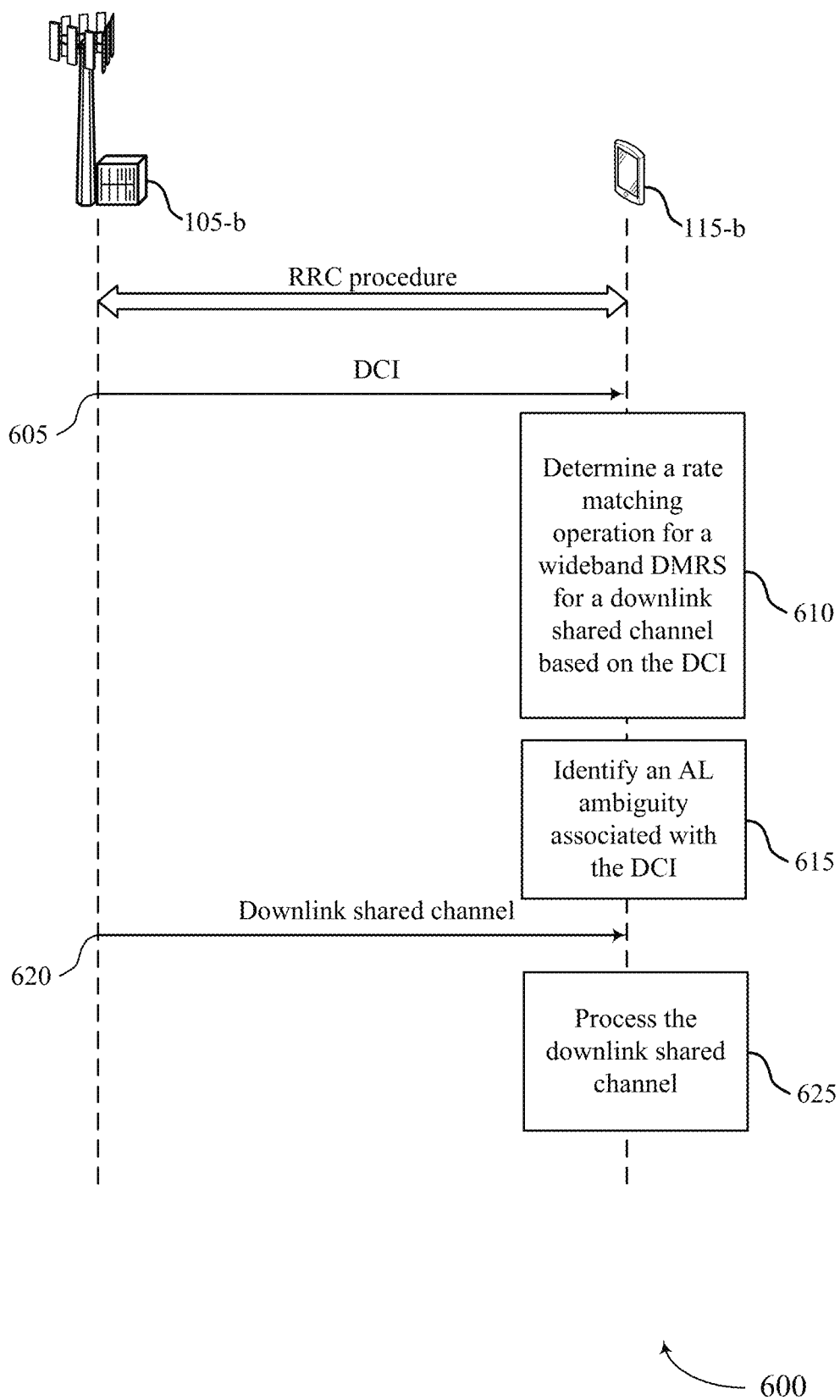
FIG. 6 illustrates an example of a process flow that supports that supports shared channel rate matching with wideband DMRS for a control channel in accordance with aspects of the present disclosure.

FIG. 6 illustrates an example of a process flow 600 that supports shared channel rate matching with wideband DMRS for a control channel in accordance with aspects of the present disclosure. In some examples, the process flow 600 may implement aspects of the wireless communications system 100 and 200. Base station 105-b and UE 115-b may be examples of the corresponding devices described with reference to FIGS. 1 and 2.

In the following description of the process flow 600, the operations between the base station 105-b and the UE 115-b may be transmitted in a different order than the exemplary order shown, or the operations performed by the base station 105-b and the UE 115-b may be performed in different orders or at different times. Certain operations may also be left out of the process flow 600, or other operations may be added to the process flow 600.

In some examples, the process flow 600 may commence with the base station 105-b establishing a connection with the UE 115-b (e.g., performing a cell acquisition procedure, a random access procedure, an RRC connection procedure, an RRC configuration procedure).

At 605, the base station 105-b may transmit a DCI to the UE 115-b. In some examples, the base station 105-b may transmit the DCI to the UE 115-b at a first AL within a CORESET configured for wideband reference signal. The DCI may include a grant of a set of resources for a downlink shared channel that overlaps with the CORESET. In some cases, the CORESET may include a number of disjoint segments of RBs. In this case, the DCI may be located at least partially within a first segment of the disjoint segments and a second segment of the disjoint segments may be exclusive of the DCI.

At 610, the UE 115-b may determine a rate matching operation for a wideband DMRS for a downlink shared channel based on the DCI. For example, the UE 115-b may determine a rate matching operation for the wideband DMRS for the downlink shared channel for portions of the set of resources that overlap with the second segment of the disjoint segment. In some examples, the rate matching operation may include rate matching around locations of the configured wideband DMRS in the portions of the set of resources of the downlink shared channel that overlap with the second segment of the disjoint segments. In some examples, the UE 115-b may determine that the wideband DMRS is not present in the set of resources that overlap with the second segment of the disjoint segments.

At 615, the UE 115-b may identify an AL ambiguity associated with the DCI. For example, the UE 115-b may identify an AL ambiguity between the DCI transmitted at the first AL and transmitted at a second AL. The first AL may correspond to a first set of CCEs and the second AL may correspond to a second set of CCEs that at least partially overlap with the first set of CCEs.

At 620, the base station 105-b may transmit a downlink shared channel to the UE 115-b. At 325, the UE 115-b may process the downlink shared channel. In some examples, the UE 115-b may receive the downlink shared channel on the set of resources and rate match based on the rate matching operation. For example, the UE 115-b may rate match the set of resources around portions of the second set of CCEs that are exclusive of the first set of CCEs.

Figure 7:
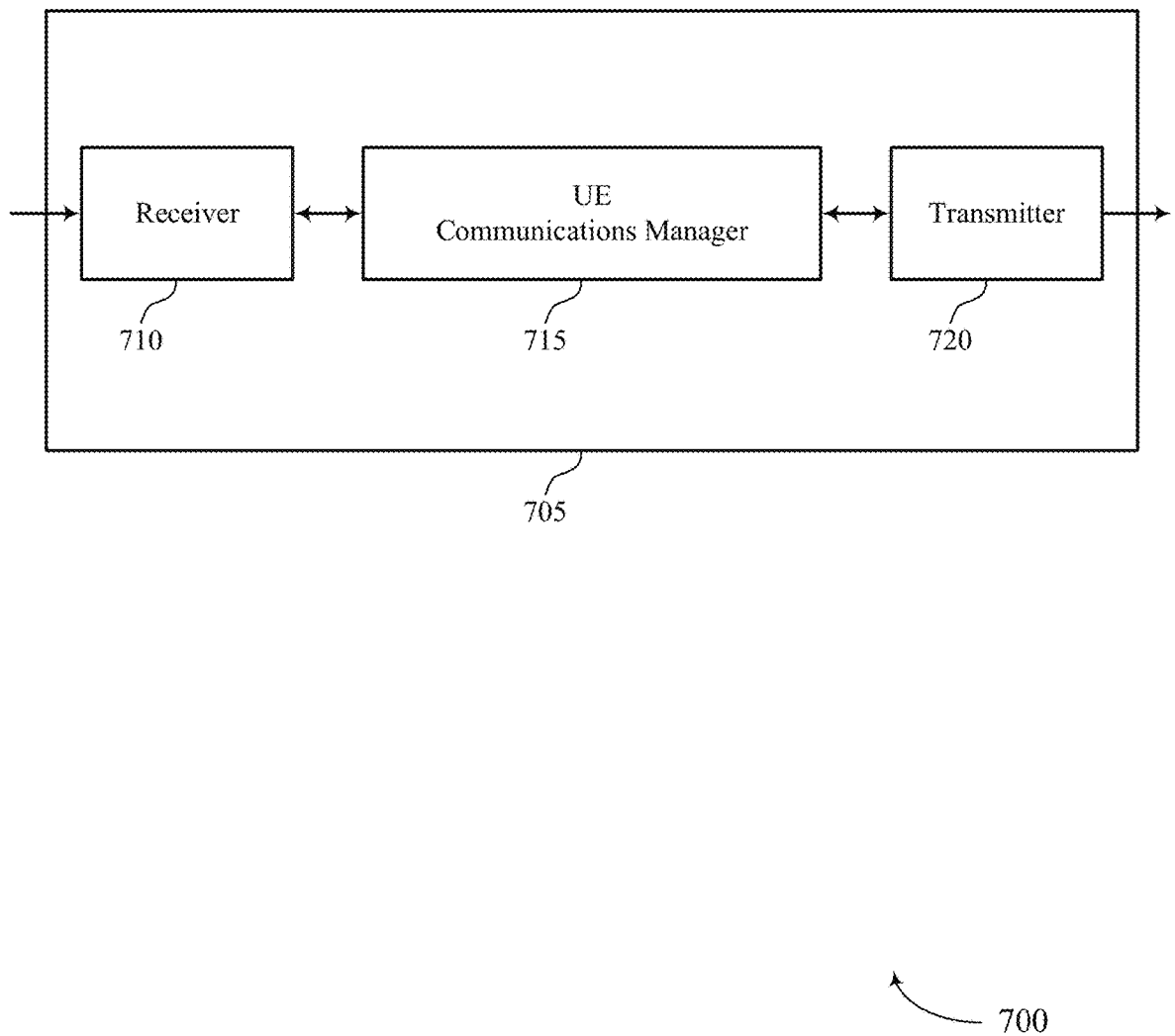
FIGS. 7 and 8 show block diagrams of devices that support shared channel rate matching with wideband DMRS for a control channel in accordance with aspects of the present disclosure.

FIG. 7 shows a block diagram 700 of a device 705 that supports shared channel rate matching with wideband DMRS for a control channel in accordance with aspects of the present disclosure. The device 705 may be an example of aspects of a UE 115 as described herein. The device 705 may include a receiver 710, a UE communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to shared channel rate matching with wideband DMRS for a control channel, etc.). Information may be passed on to other components of the device 705. The receiver 710 may be an example of aspects of the transceiver 920 described with reference to FIG. 9. The receiver 710 may utilize a single antenna or a set of antennas.

The UE communications manager 715 may receive DCI within a CORESET configured with a wideband DMRS and comprising a plurality of disjoint segments of RBs, where the DCI is located at least partially within a first segment of the plurality of disjoint segments and a second segment of the plurality of disjoint segments is exclusive of the DCI, and where the DCI includes a grant of a set of resources for a downlink shared channel that overlaps with the CORESET, determine a rate matching operation for the wideband DMRS for the downlink shared channel for portions of the set of resources that overlap with the second segment of the plurality of disjoint segments, and receive the downlink shared channel on the set of resources according to the determined rate matching operation.

The UE communications manager 715 may also receive DCI at a first AL within a CORESET configured with a wideband DMRS, where the DCI includes a grant of a set of resources for a downlink shared channel that overlaps with the CORESET, identify an AL ambiguity between the DCI transmitted at the first AL and transmitted at a second AL, where the first AL corresponds to a first set of CCEs and the second AL corresponds to a second set of CCEs that at least partially overlap with the first set of CCEs, and receive the downlink shared channel on the set of resources, where receiving the downlink shared channel includes rate matching the set of resources around portions of the second set of CCEs that are exclusive of the first set of CCEs. The UE communications manager 715 may be an example of aspects of the UE communications manager 910 described herein.

The UE communications manager 715, or its sub-components, may be implemented in hardware, code (e.g., software or firmware) executed by a processor, or any combination thereof. If implemented in code executed by a processor, the functions of the UE communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The UE communications manager 715, or its sub-components, may be physically located at various positions, including being distributed such that portions of functions are implemented at different physical locations by one or more physical components. In some examples, the UE communications manager 715, or its sub-components, may be a separate and distinct component in accordance with various aspects of the present disclosure. In some examples, the UE communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 920 described with reference to FIG. 9. The transmitter 720 may utilize a single antenna or a set of antennas.

Figure 8:
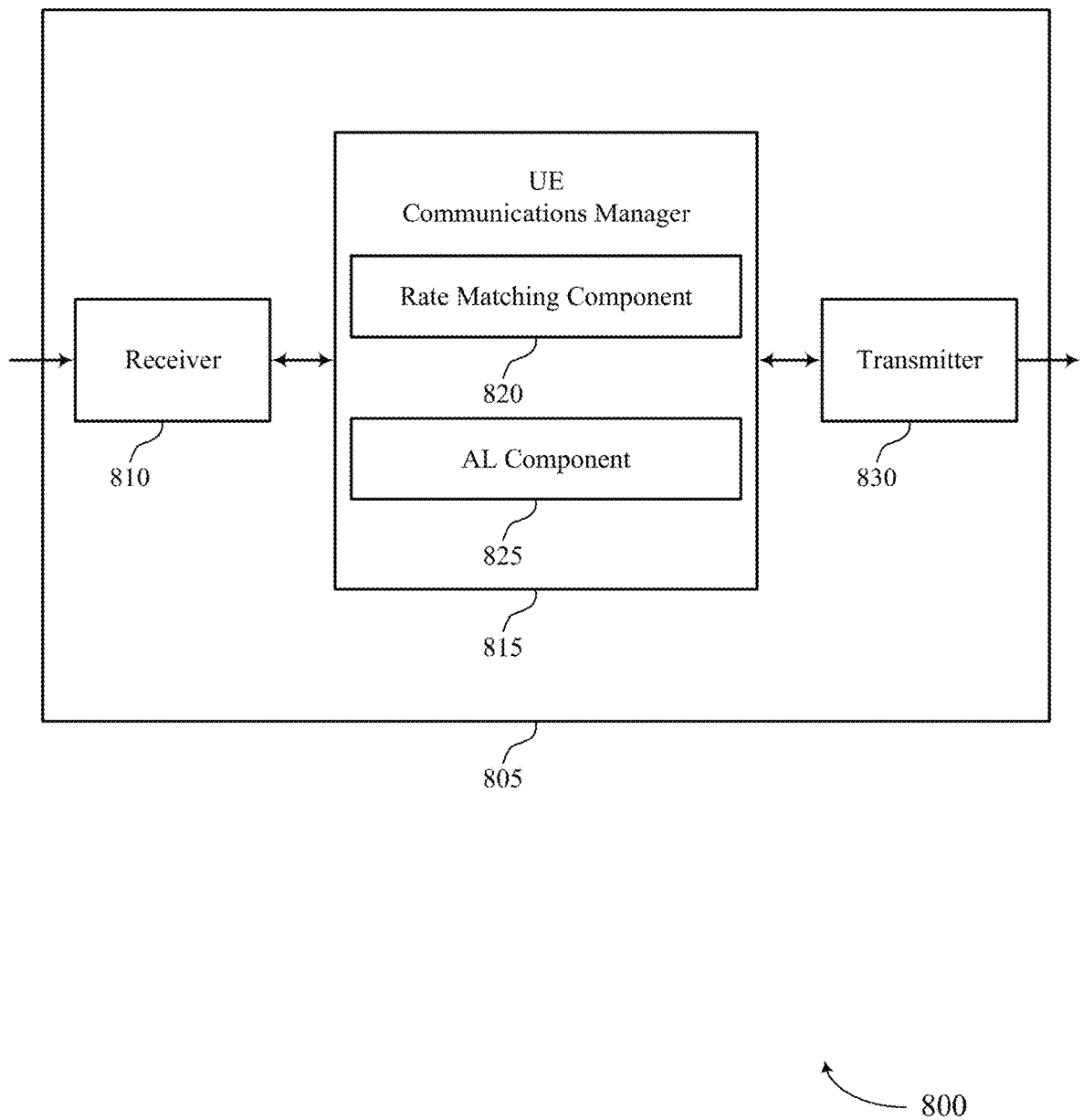

FIG. 8 shows a block diagram 800 of a device 805 that supports shared channel rate matching with wideband DMRS for a control channel in accordance with aspects of the present disclosure. The device 805 may be an example of aspects of a device 705 or a UE 115 as described herein. The device 805 may include a receiver 810, a UE communications manager 815, and a transmitter 830. The device 805 may also include a processor. Each of these components may be in communication with one another (e.g., via one or more buses).

The receiver 810 may receive information such as packets, user data, or control information associated with various information channels (e.g., control channels, data channels, and information related to shared channel rate matching with wideband DMRS for a control channel, etc.). Information may be passed on to other components of the device 805. The receiver 810 may be an example of aspects of the transceiver 920 described with reference to FIG. 9. The receiver 810 may utilize a single antenna or a set of antennas.

The receiver 810 may receive DCI within a CORESET configured with a wideband DMRS and including a set of disjoint segments of RBs, where the DCI is located at least partially within a first segment of the set of disjoint segments and a second segment of the set of disjoint segments is exclusive of the DCI, and where the DCI includes a grant of a set of resources for a downlink shared channel that overlaps with the CORESET. In some examples, the disjoint segments of the RBs may be contiguous. The receiver 810 may receive the downlink shared channel on the set of resources according to the determined rate matching operation.

The receiver 810 may receive the DCI at a first AL within a CORESET configured with a wideband DMRS, where the DCI includes a grant of a set of resources for a downlink shared channel that overlaps with the CORESET. The receiver 810 may receive the downlink shared channel on the set of resources, where the receiving the downlink shared channel includes rate matching the set of resources around portions of a second set of CCEs that are exclusive of a first set of CCEs. The receiver 810 may receive, in the DCI, an indication to rate match the downlink shared channel around resources of the CORESET.

The UE communications manager 815 may be an example of aspects of the UE communications manager 715 as described herein. The UE communications manager 815 may include a rate matching component 820 and an AL component 825. The UE communications manager 815 may be an example of aspects of the UE communications manager 910 described herein.

The rate matching component 820 may determine a rate matching operation for the wideband DMRS for the downlink shared channel for portions of the set of resources that overlap with the second segment of the set of disjoint segments. The AL component 825 may identify an AL ambiguity between the DCI transmitted at the first AL and transmitted at a second AL, where the first AL corresponds to a first set of CCEs and the second AL corresponds to a second set of CCEs that at least partially overlap with the first set of CORESET.

The transmitter 830 may transmit signals generated by other components of the device 805. In some examples, the transmitter 830 may be collocated with a receiver 810 in a transceiver module. For example, the transmitter 830 may be an example of aspects of the transceiver 920 described with reference to FIG. 9. The transmitter 830 may utilize a single antenna or a set of antennas.

Figure 9:
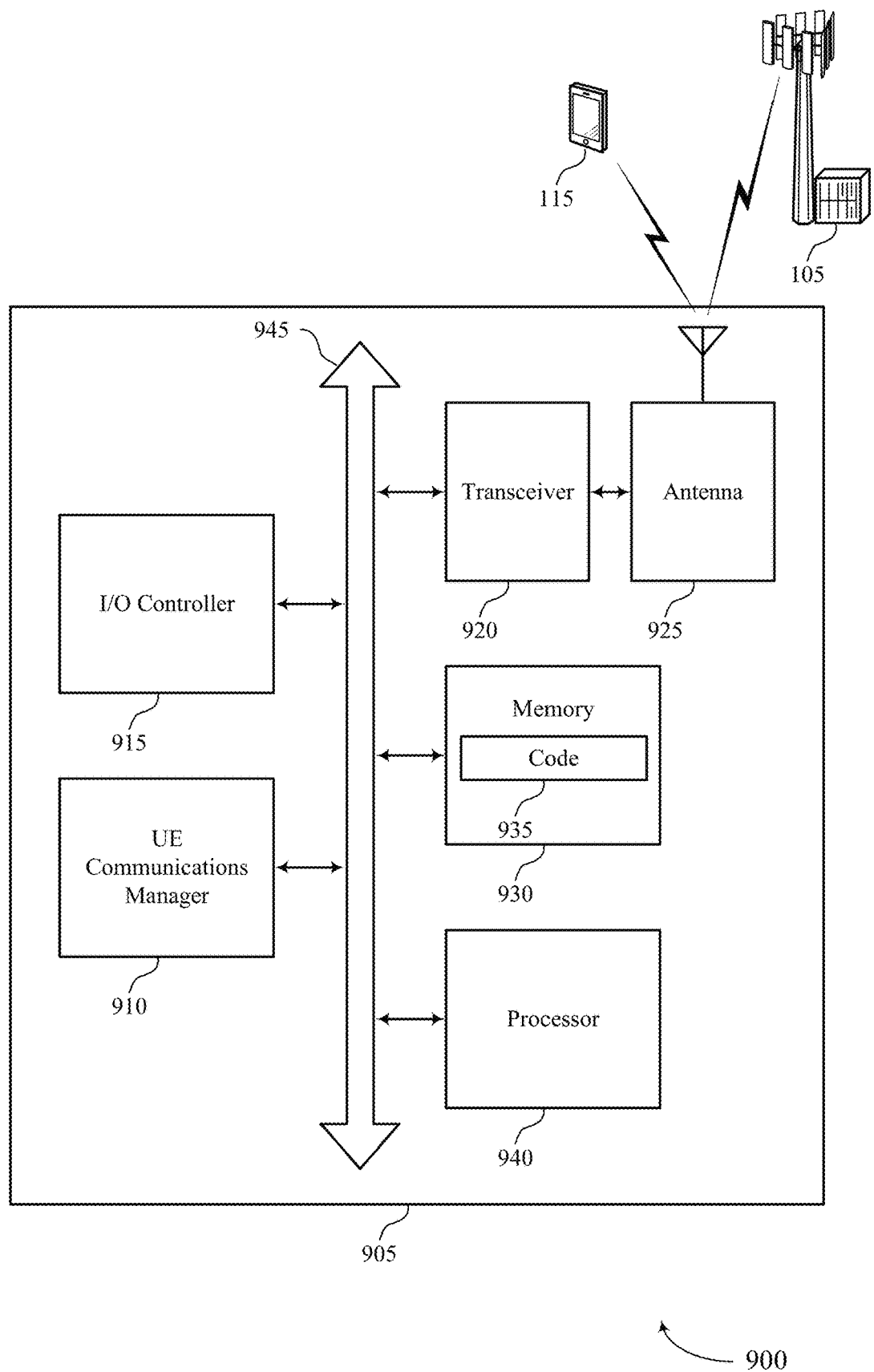
FIG. 9 shows a diagram of a system including a device that supports shared channel rate matching with wideband DMRS for a control channel in accordance with aspects of the present disclosure.

FIG. 9 shows a diagram of a system 900 including a device 905 that supports shared channel rate matching with wideband DMRS for a control channel in accordance with aspects of the present disclosure. The device 905 may be an example of or include the components of device 705, device 805, or a UE 115 as described herein. The device 905 may include components for bi-directional voice and data communications including components for transmitting and receiving communications, including a UE communications manager 910, an I/O controller 915, a transceiver 920, an antenna 925, memory 930, and a processor 940. These components may be in electronic communication via one or more buses (e.g., bus 945).

The UE communications manager 910 may receive DCI within a CORESET configured with a wideband DMRS and comprising a plurality of disjoint segments of RBs, where the DCI is located at least partially within a first segment of the plurality of disjoint segments and a second segment of the plurality of disjoint segments is exclusive of the DCI, and where the DCI includes a grant of a set of resources for a downlink shared channel that overlaps with the CORESET, determine a rate matching operation for the wideband DMRS for the downlink shared channel for portions of the set of resources that overlap with the second segment of the plurality of disjoint segments, and receive the downlink shared channel on the set of resources according to the determined rate matching operation.

The UE communications manager 910 may also receive DCI at a first AL within a CORESET configured with a wideband DMRS, where the DCI includes a grant of a set of resources for a downlink shared channel that overlaps with the CORESET, identify an AL ambiguity between the DCI transmitted at the first AL and transmitted at a second AL, where the first AL corresponds to a first set of CCEs and the second AL corresponds to a second set of CCEs that at least partially overlap with the first set of CCEs, and receive the downlink shared channel on the set of resources, where receiving the downlink shared channel includes rate matching the set of resources around portions of the second set of CCEs that are exclusive of the first set of CCEs.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas. In some cases, the device 905 may include a single antenna 925. However, in some cases the device 905 may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting shared channel rate matching with wideband DMRS for a control channel).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
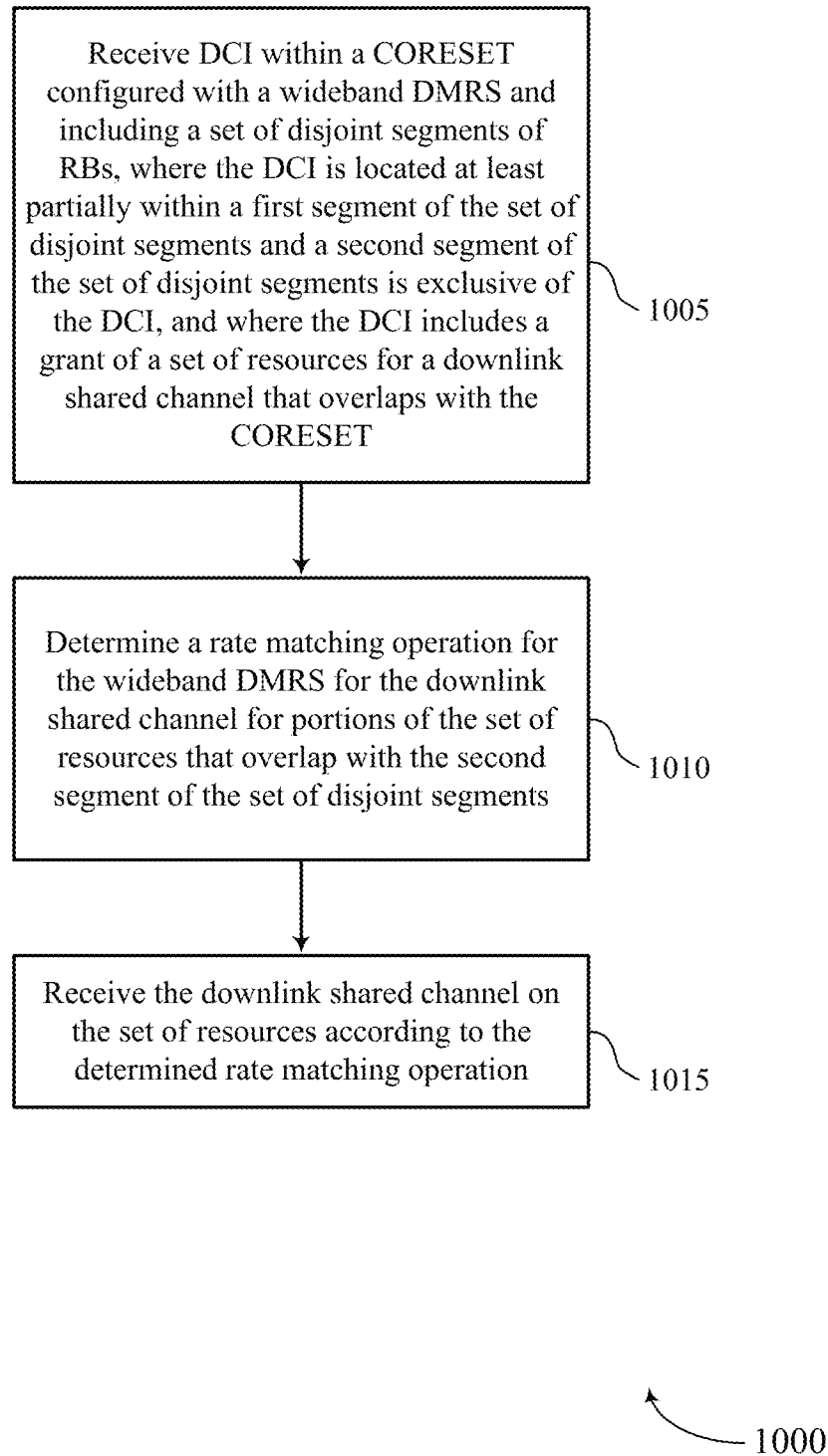
FIGS. 10 and 11 show flowcharts illustrating methods that support shared channel rate matching with wideband DMRS for a control channel in accordance with aspects of the present disclosure.

FIG. 10 shows a flowchart illustrating a method 1000 that supports shared channel rate matching with wideband DMRS for a control channel in accordance with aspects of the present disclosure. The operations of method 1000 may be implemented by a UE 115 or its components as described herein. For example, the operations of method 1000 may be performed by a UE communications manager as described with reference to FIGS. 7 through 9. In some examples, a UE may execute a set of instructions to control the functional elements of the UE to perform the functions described below. Additionally or alternatively, a UE may perform aspects of the functions described below using special-purpose hardware.

At 1005, the UE may receive DCI within a CORESET configured with a wideband DMRS and including a set of disjoint segments of RBs, where the DCI is located at least partially within a first segment of the set of disjoint segments and a second segment of the set of disjoint segments is exclusive of the DCI, and where the DCI includes a grant of a set of resources for a downlink shared channel that overlaps with the CORESET. The operations of 1005 may be performed according to the methods described herein. In some examples, aspects of the operations of 1005 may be performed by a receiver as described with reference to FIGS. 7 through 9.

At 1010, the UE may determine a rate matching operation for the wideband DMRS for the downlink shared channel for portions of the set of resources that overlap with the second segment of the set of disjoint segments. The operations of 1010 may be performed according to the methods described herein. In some examples, aspects of the operations of 1010 may be performed by a rate matching component as described with reference to FIGS. 7 through 9.

At 1015, the UE may receive the downlink shared channel on the set of resources according to the determined rate matching operation. The operations of 1015 may be performed according to the methods described herein. In some examples, aspects of the operations of 1015 may be performed by a receiver as described with reference to FIGS. 7 through 9.

Figure 11:
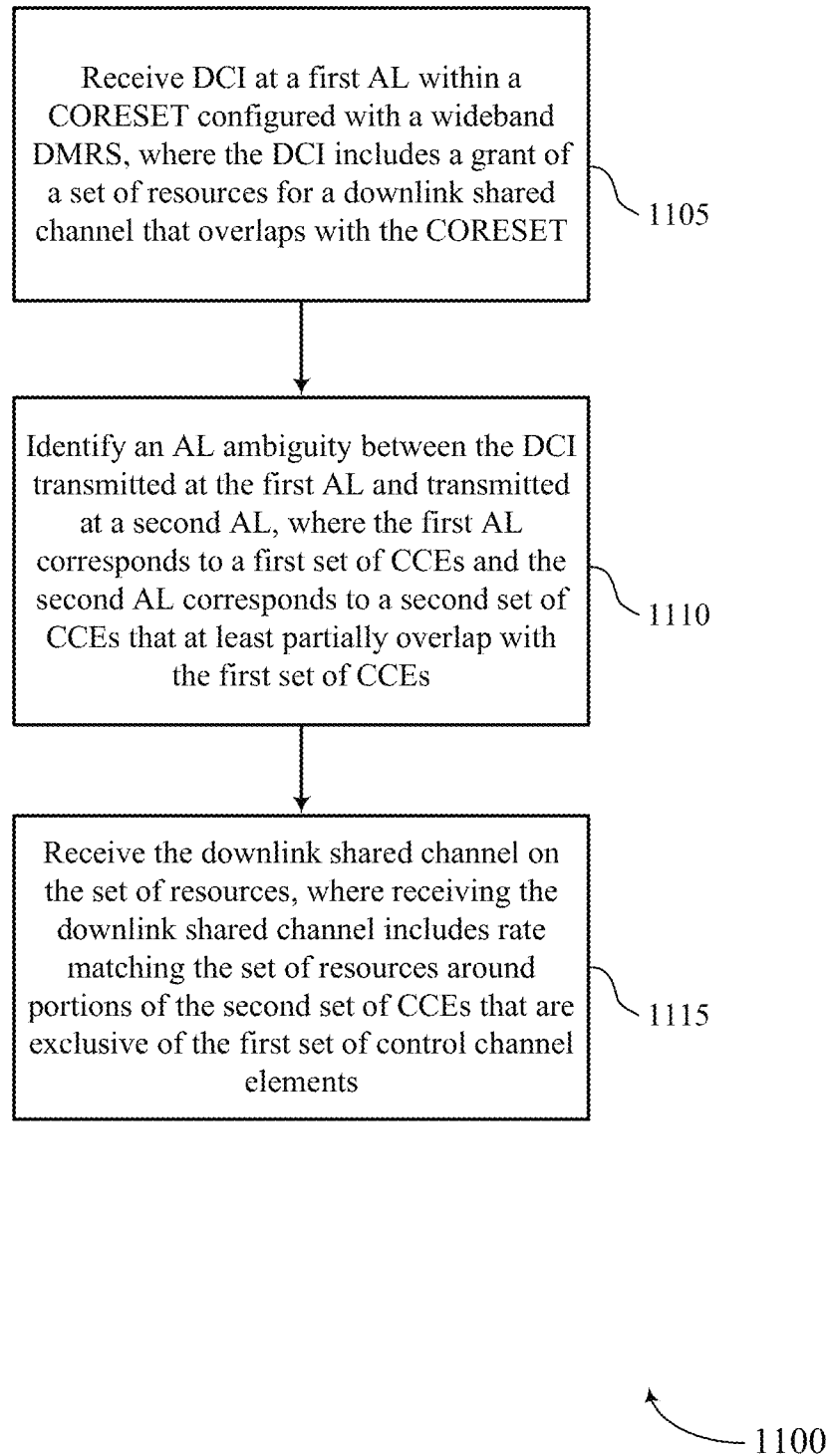

FIG. 11 shows a flowchart illustrating a method 1100 that supports shared channel rate matching with wideband DMRS for a control channel in accordance with aspects of the present disclosure. The operations of method 1100 may be implemented by a UE 115 or its components as described herein. For example, the operations of method 1100 may be performed by a UE communications manager as described with reference to FIGS. 7 through 9. In some examples, a UE may execute a set of instructions to control the functional elements of the UE to perform the functions described below. Additionally or alternatively, a UE may perform aspects of the functions described below using special-purpose hardware.

At 1105, the UE may receive DCI at a first AL within a CORESET configured with a wideband DMRS, where the DCI includes a grant of a set of resources for a downlink shared channel that overlaps with the CORESET. The operations of 1105 may be performed according to the methods described herein. In some examples, aspects of the operations of 1105 may be performed by a receiver as described with reference to FIGS. 7 through 9.

At 1110, the UE may identify an AL ambiguity between the DCI transmitted at the first AL and transmitted at a second AL, where the first AL corresponds to a first set of CCEs and the second AL corresponds to a second set of CCEs that at least partially overlap with the first set of CCEs. The operations of 1110 may be performed according to the methods described herein. In some examples, aspects of the operations of 1110 may be performed by an AL component as described with reference to FIGS. 7 through 9.

At 1115, the UE may receive the downlink shared channel on the set of resources, where the receiving the downlink shared channel includes rate matching the set of resources around portions of the second set of CCEs that are exclusive of the first set of CCEs. The operations of 1115 may be performed according to the methods described herein. In some examples, aspects of the operations of 1115 may be performed by a receiver as described with reference to FIGS. 7 through 9.

It should be noted that the methods described above describe possible implementations, and that the operations and the steps may be rearranged or otherwise modified and that other implementations are possible. Further, aspects from two or more of the methods may be combined.

Embodiment 1

A method for wireless communications, comprises: receiving DCI within a CORESET configured with a wideband DMRS and comprising a plurality of disjoint segments of RBs, where the DCI is located at least partially within a first segment of the plurality of disjoint segments and a second segment of the plurality of disjoint segments is exclusive of the DCI, and wherein the DCI comprises a grant of a set of resources for a downlink shared channel that overlaps with the CORESET; determining a rate matching operation for the wideband DMRS for the downlink shared channel for portions of the set of resources that overlap with the second segment of the plurality of disjoint segments; and receiving the downlink shared channel on the set of resources according to the determined rate matching operation.

Embodiment 2

The method of embodiment 1, wherein the rate matching operation comprises rate matching around locations of the configured wideband DMRS in the portions of the set of resources of the downlink shared channel that overlap with the second segment of the plurality of disjoint segments.

Embodiment 3

The method of any of embodiments 1 or 2, wherein the rate matching operation comprises processing locations of the configured wideband DMRS in the portions of the set of resources of the downlink shared channel that overlap with the second segment of the plurality of disjoint segments as data resources of the downlink shared channel.

Embodiment 4

The method of any of embodiments 1 to 3, further comprising receiving, in the DCI, an indication to rate match the downlink shared channel around resources of the CORESET.

Embodiment 5

The method of any of embodiments 1 to 4, wherein the RBs in each disjoint segment of the plurality of disjoint segments are contiguous.

Embodiment 6

An apparatus for wireless communications comprising a processor; memory in electronic communication with the processor; and instructions stored in the memory and executable by the processor to cause the apparatus to perform a method of any of embodiments 1 to 5.

Embodiment 7

An apparatus comprising at least one means for performing a method of any of embodiments 1 to 5.

Embodiment 8

A non-transitory computer-readable medium storing code for wireless communications, the code comprising instructions executable by a processor to perform a method of any of embodiments 1 to 5.

Embodiment 9

A method for wireless communications, comprises: receiving DCI at a first AL within a CORESET configured with a wideband DMRS, wherein the DCI comprises a grant of a set of resources for a downlink shared channel that overlaps with the CORESET; identifying an AL ambiguity between the DCI transmitted at the first AL and transmitted at a second AL, wherein the first AL corresponds to a first set of CCEs and the second AL corresponds to a second set of CCEs that at least partially overlap with the first set of CCEs; and receiving the downlink shared channel on the set of resources, wherein the receiving the downlink shared channel comprises rate matching the set of resources around portions of the second set of CCEs that are exclusive of the first set of CCEs.

Embodiment 10

The method of embodiment 9, wherein the CORESET comprises a plurality of disjoint segments of RBs, and wherein the first set of CCEs are located within a first subset of the plurality of disjoint segments and at least part of the portions of the second set of CCEs that are exclusive of the first set of CCEs are located within a second subset of the plurality of disjoint segments.

Embodiment 11

The method of any of embodiments 9 or 10, wherein the RBs in each disjoint segment of the plurality of disjoint segments are contiguous.

Embodiment 12

The method of any of embodiments 9 to 11, wherein the receiving the downlink shared channel comprises rate matching the set of resources around locations of the configured wideband DMRS in the second subset of the plurality of disjoint segments.

Embodiment 13

The method of any of embodiments 9 to 12, wherein at least one segment of the plurality of disjoint segments is exclusive of the first set of CCEs and the second set of CCEs, and wherein the receiving the downlink shared channel comprises processing locations of the configured wideband DMRS in the portions of the set of resources of the downlink shared channel that overlap with the at least one segment of the plurality of disjoint segments as data resources of the downlink shared channel.

Embodiment 14

The method of any of embodiments 9 to 13, wherein at least one segment of the plurality of disjoint segments is exclusive of the first set of CCEs and the second set of CCEs, and wherein the receiving the downlink shared channel comprises rate matching around locations of the configured wideband DMRS in the portions of the set of resources of the downlink shared channel that overlap with the at least one segment of the plurality of disjoint segments.

Embodiment 15

An apparatus for wireless communications comprising a processor; memory in electronic communication with the processor; and instructions stored in the memory and executable by the processor to cause the apparatus to perform a method of any of embodiments 9 to 14.

Embodiment 16

An apparatus comprising at least one means for performing a method of any of embodiments 9 to 14.

Embodiment 17

A non-transitory computer-readable medium storing code for wireless communications, the code comprising instructions executable by a processor to perform a method of any of embodiments 9 to 14.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
   receiving downlink control information (DCI) within a control resource set (CORESET) configured with a wideband demodulation reference signal (DMRS) and comprising a plurality of disjoint segments of resource blocks (RBs), wherein the DCI is located at least partially within a first segment of the plurality of disjoint segments and a second segment of the plurality of disjoint segments is exclusive of the DCI, and wherein the DCI comprises a grant of a set of resources for a downlink shared channel that overlaps with the CORESET;
   determining a rate matching operation for the wideband DMRS for the downlink shared channel for portions of the set of resources that overlap with the second segment of the plurality of disjoint segments; and
   receiving the downlink shared channel on the set of resources according to the determined rate matching operation.

2. The method of claim 1, wherein the rate matching operation comprises rate matching around locations of the configured wideband DMRS in the portions of the set of resources of the downlink shared channel that overlap with the second segment of the plurality of disjoint segments.

3. The method of claim 1, wherein the rate matching operation comprises processing locations of the configured wideband DMRS in the portions of the set of resources of the downlink shared channel that overlap with the second segment of the plurality of disjoint segments as data resources of the downlink shared channel.

4. The method of claim 1, further comprising:
   receiving, in the DCI, an indication to rate match the downlink shared channel around resources of the CORESET.

5. The method of claim 1, wherein the RBs in each disjoint segment of the plurality of disjoint segments are contiguous.

6. An apparatus for wireless communications, comprising:
a processor,
memory in electronic communication with the processor; and
instructions stored in the memory and executable by the processor to cause the apparatus to:
receive downlink control information (DCI) within a control resource set (CORESET) configured with a wideband demodulation reference signal (DMRS) and comprising a plurality of disjoint segments of resource blocks (RBs), wherein the DCI is located at least partially within a first segment of the plurality of disjoint segments and a second segment of the plurality of disjoint segments is exclusive of the DCI, and wherein the DCI comprises a grant of a set of resources for a downlink shared channel that overlaps with the CORESET;
determine a rate matching operation for the wideband DMRS for the downlink shared channel for portions of the set of resources that overlap with the second segment of the plurality of disjoint segments; and
receive the downlink shared channel on the set of resources according to the determined rate matching operation.

7. The apparatus of claim 6, wherein the instructions to determine the rate matching operation are further executable by the processor to cause the apparatus to rate match around locations of the configured wideband DMRS in the portions of the set of resources of the downlink shared channel that overlap with the second segment of the plurality of disjoint segments.

8. The apparatus of claim 6, wherein the instructions to determine the rate matching operation are further executable by the processor to cause the apparatus to process locations of the configured wideband DMRS in the portions of the set of resources of the downlink shared channel that overlap with the second segment of the plurality of disjoint segments as data resources of the downlink shared channel.

9. The apparatus of claim 6, wherein the instructions are further executable by the processor to cause the apparatus to:
receive, in the DCI, an indication to rate match the downlink shared channel around resources of the CORESET.

10. The apparatus of claim 6, wherein the RBs in each disjoint segment of the plurality of disjoint segments are contiguous.

11. An apparatus for wireless communications, comprising:
means for receiving downlink control information (DCI) within a control resource set (CORESET) configured with a wideband demodulation reference signal (DMRS) and comprising a plurality of disjoint segments of resource blocks (RBs), wherein the DCI is located at least partially within a first segment of the plurality of disjoint segments and a second segment of the plurality of disjoint segments is exclusive of the DCI, and wherein the DCI comprises a grant of a set of resources for a downlink shared channel that overlaps with the CORESET;
means for determining a rate matching operation for the wideband DMRS for the downlink shared channel for portions of the set of resources that overlap with the second segment of the plurality of disjoint segments; and
means for receiving the downlink shared channel on the set of resources according to the determined rate matching operation.

12. The apparatus of claim 11, wherein the means for determining the rate matching operation comprises means for rate matching around locations of the configured wideband DMRS in the portions of the set of resources of the downlink shared channel that overlap with the second segment of the plurality of disjoint segments.

13. The apparatus of claim 11, wherein the means for determining the rate matching operation comprises means for processing locations of the configured wideband DMRS in the portions of the set of resources of the downlink shared channel that overlap with the second segment of the plurality of disjoint segments as data resources of the downlink shared channel.

14. The apparatus of claim 11, further comprising:
means for receiving, in the DCI, an indication to rate match the downlink shared channel around resources of the CORESET.

15. The apparatus of claim 11, wherein the RBs in each disjoint segment of the plurality of disjoint segments are contiguous.

16. A non-transitory computer-readable medium storing code for wireless communications, the code comprising instructions executable by a processor to:
receive downlink control information (DCI) within a control resource set (CORESET) configured with a wideband demodulation reference signal (DMRS) and comprising a plurality of disjoint segments of resource blocks (RBs), wherein the DCI is located at least partially within a first segment of the plurality of disjoint segments and a second segment of the plurality of disjoint segments is exclusive of the DCI, and wherein the DCI comprises a grant of a set of resources for a downlink shared channel that overlaps with the CORESET;
determine a rate matching operation for the wideband DMRS for the downlink shared channel for portions of the set of resources that overlap with the second segment of the plurality of disjoint segments; and
receive the downlink shared channel on the set of resources according to the determined rate matching operation.

* * * * *